United States Patent

[11] 3,532,026

[72] Inventors John A. Mayer,
 Tonawanda;
 Mitchell J. Banas, North Tonawanda;
 Robert E. Willer, Tonawanda, N.Y.
[21] Appl. No. 794,185
[22] Filed Jan. 27, 1969
[45] Patented Oct. 6, 1970
[73] Assignee Brighton Tool & Die Design, Inc.,
 Tonawanda, N.Y.

[54] MILLING APPARATUS FOR REMOVING A GIVEN AMOUNT OF MATERIAL FROM PARTS SATISFYING A GEOMETRIC REQUIREMENT
 18 Claims, 44 Drawing Figs.
[52] U.S. Cl. .................................................. 90/11,
 90/14, 90/15.1, 90/56
[51] Int. Cl. ........................................ B23f 23/08,
 B23c 3/00
[50] Field of Search .......................................... 90/56,
 15.1, 11, 14; 77/64; 51/(Consulted)

[56] References Cited
UNITED STATES PATENTS
3,008,382  11/1961  Hawley et al. .............  90/15.1

Primary Examiner—Gil Weidenfeld
Attorney—Christel and Bean

ABSTRACT: Parts to be machined, for example used welding electrodes, are received by a loading mechanism which senses the orientation of each part and places properly oriented parts in a disc-shaped holding member. The member is incrementally rotated at predetermined intervals by controlled drive means. A probe mechanism includes a first member which is moved into contact with the end of the part to be machined and a second member which is moved into contact with a point on the part spaced from that end, for example the inner end wall of the cooling recess in a welding electrode. Only those parts in which this measured distance is equal to or greater than a predetermined amount are operated on further by the apparatus. In one embodiment, the apparatus includes a milling machine of the type wherein the amount of material removed from each part depends upon the distance between the end of the part and a point on the milling machine housing. This distance is controlled by a stop member threadably connected in the holding member in conjunction with a mechanism for rotating the stop member an amount depending upon the location of the end of the part. In another embodiment, the milling machine is provided with a sensor for indicating the start of the machining operation and means for controlling the number of revolutions of a rotary cutting tool included therein.

Patented Oct. 6, 1970

INVENTORS
John A. Mayer, Mitchell J. Banas and
Robert E. Willer
BY

Christel + Bean
ATTORNEYS.

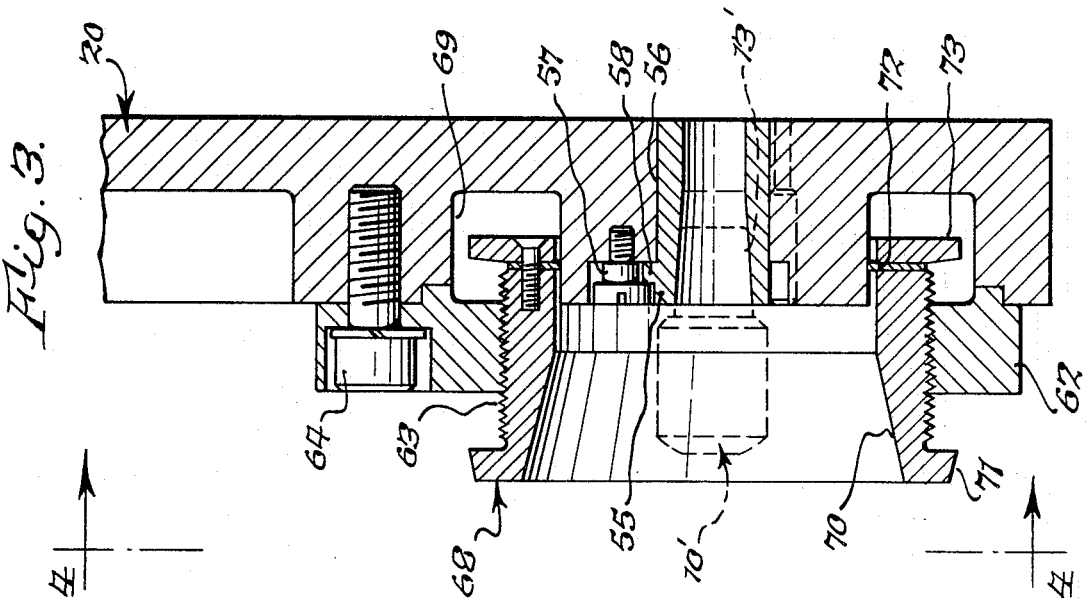
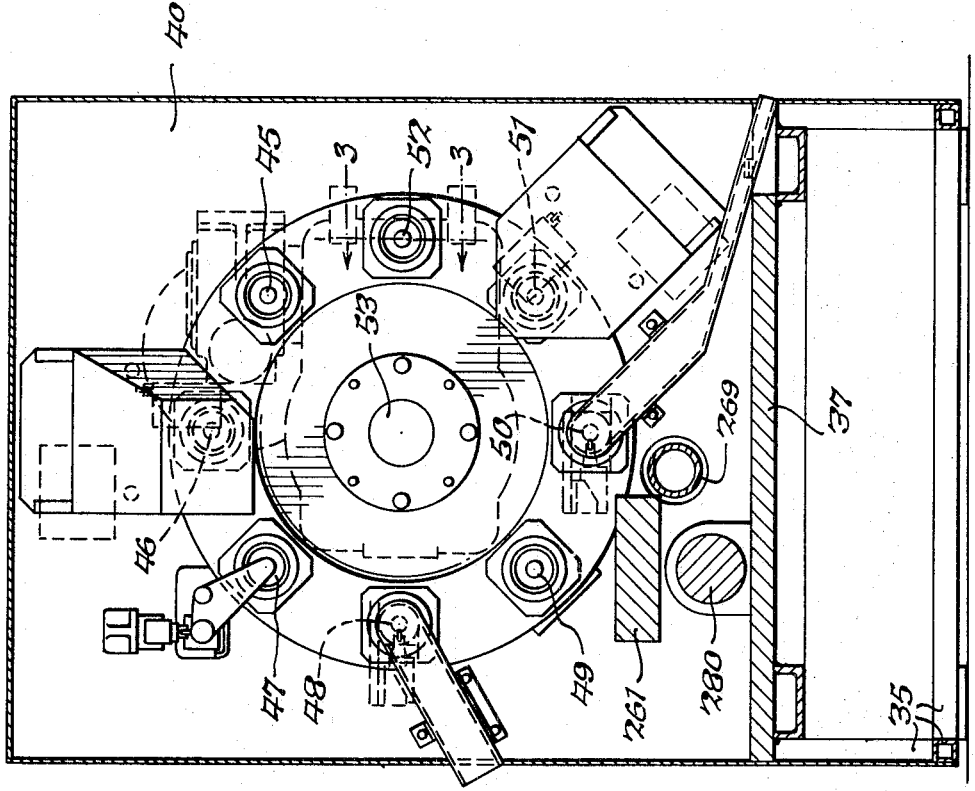
INVENTORS
John A. Mayer, Mitchell J. Banas and
Robert E. Willer
BY
Christel & Bean
ATTORNEYS.

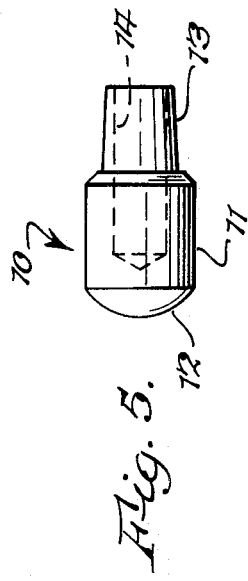
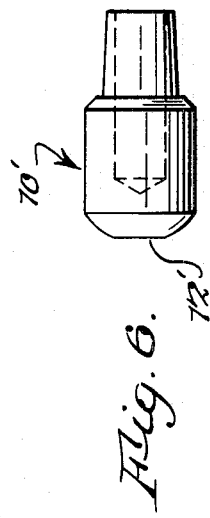
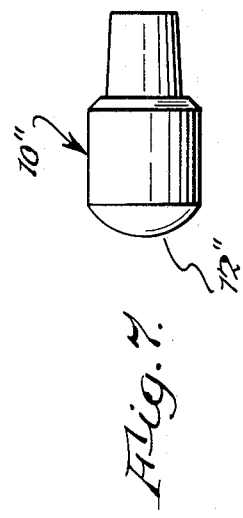
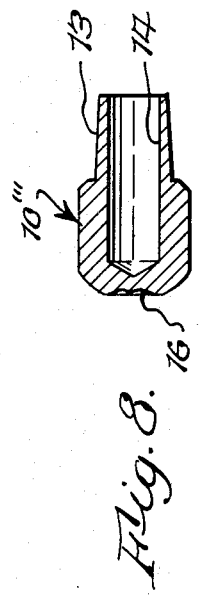
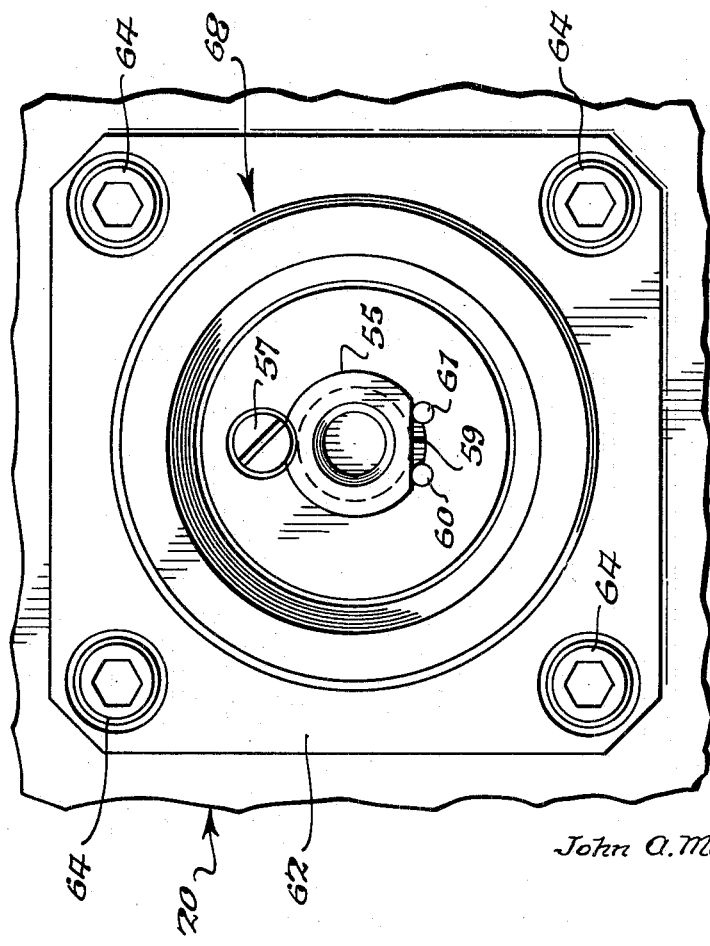

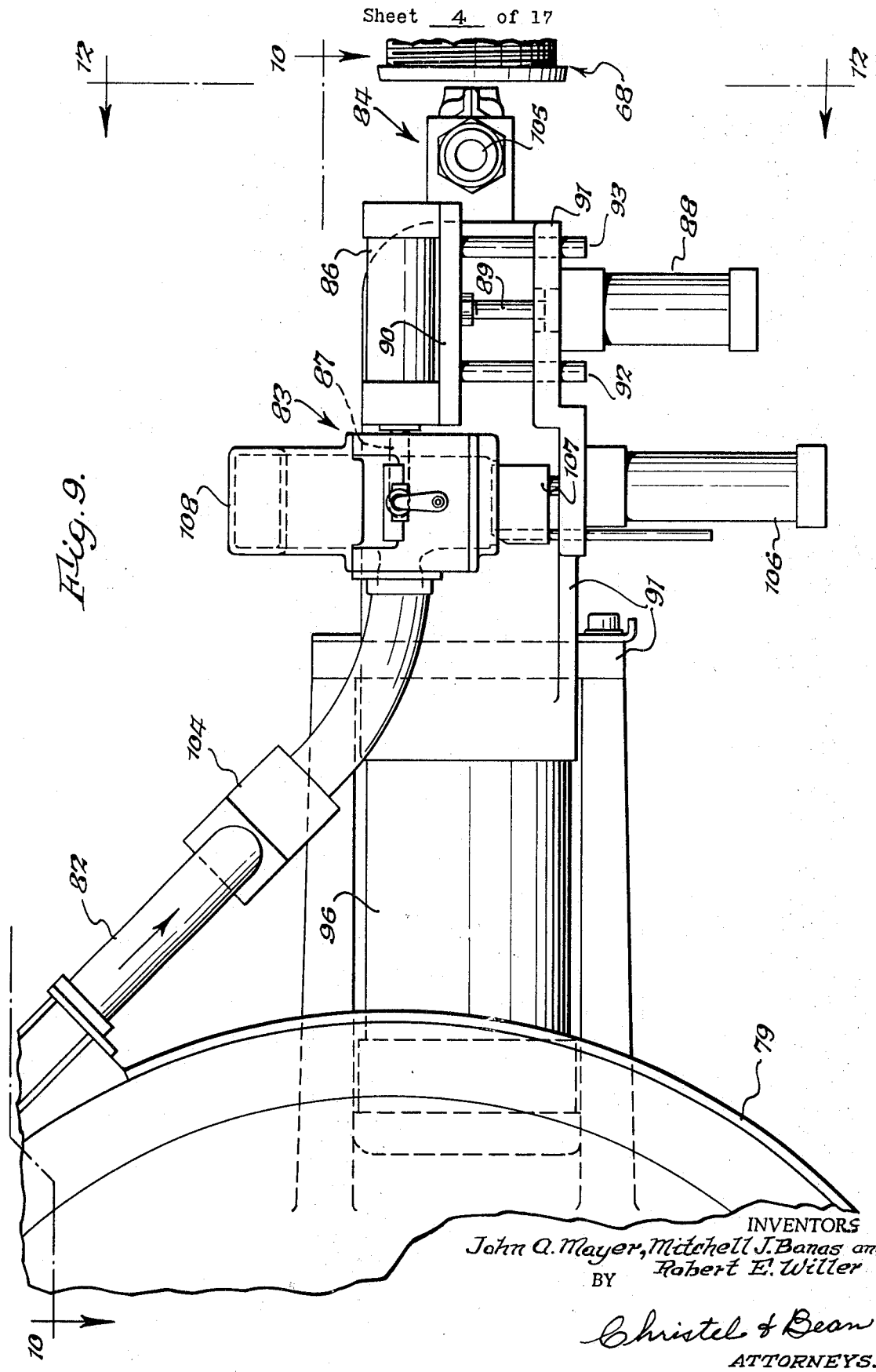

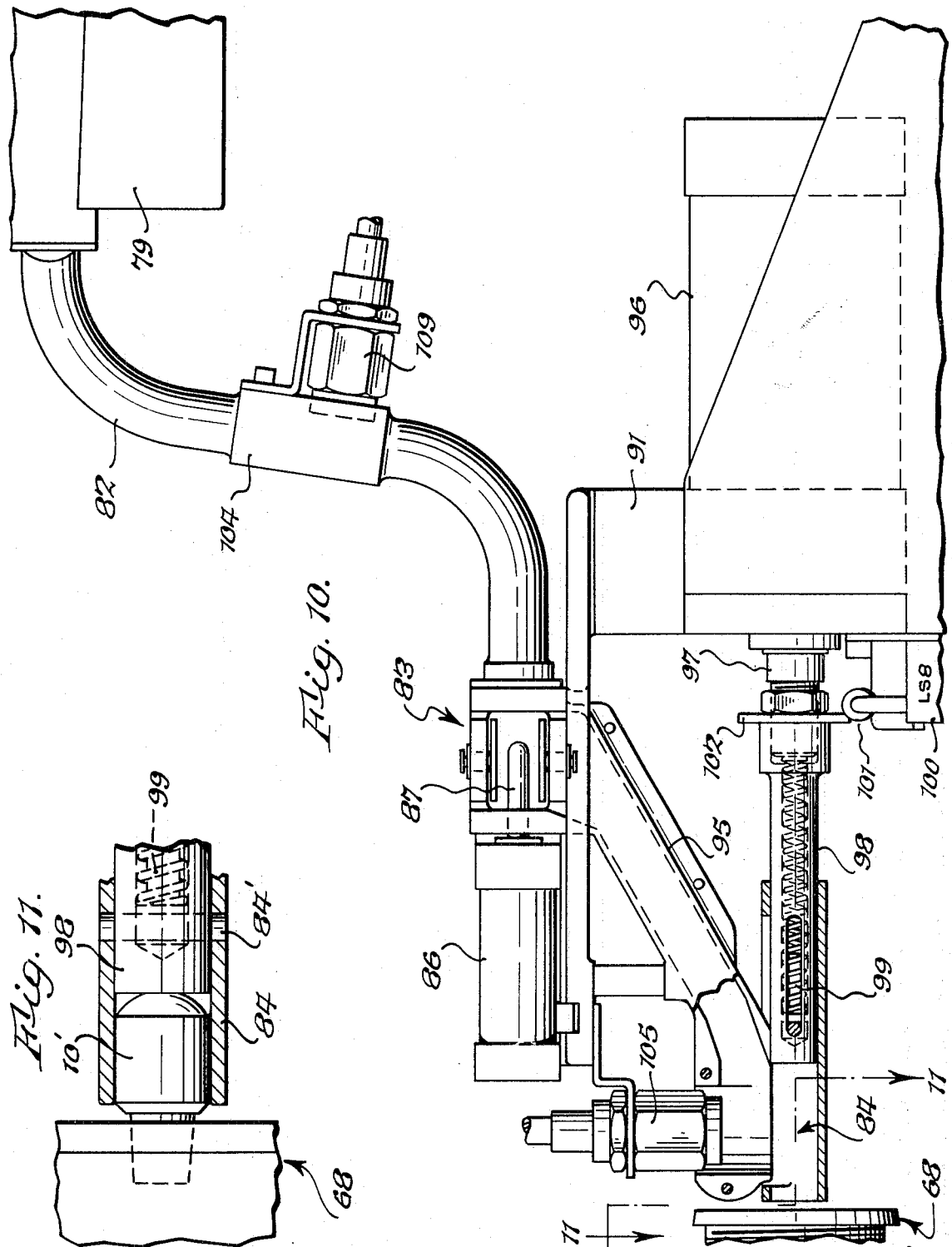

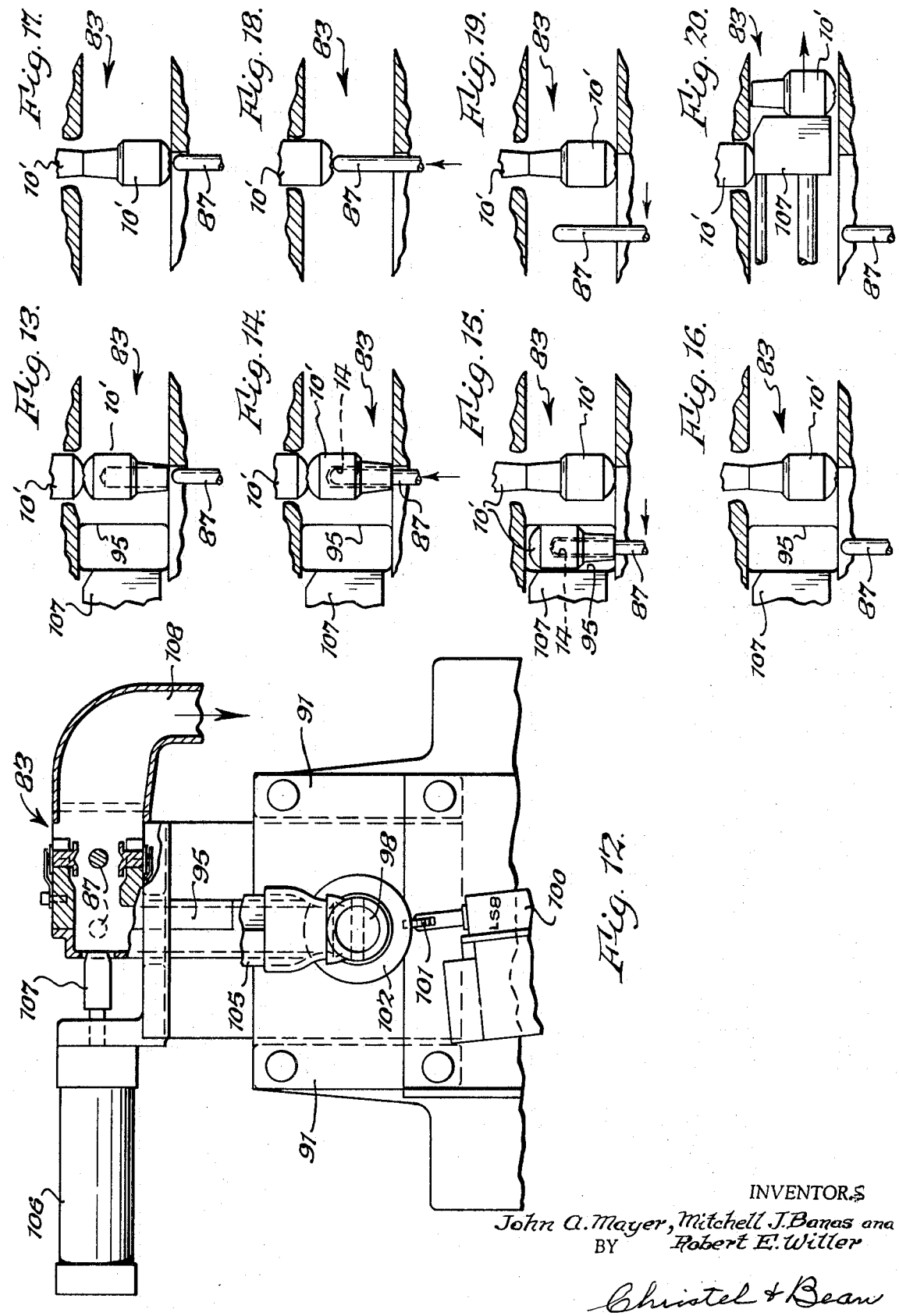

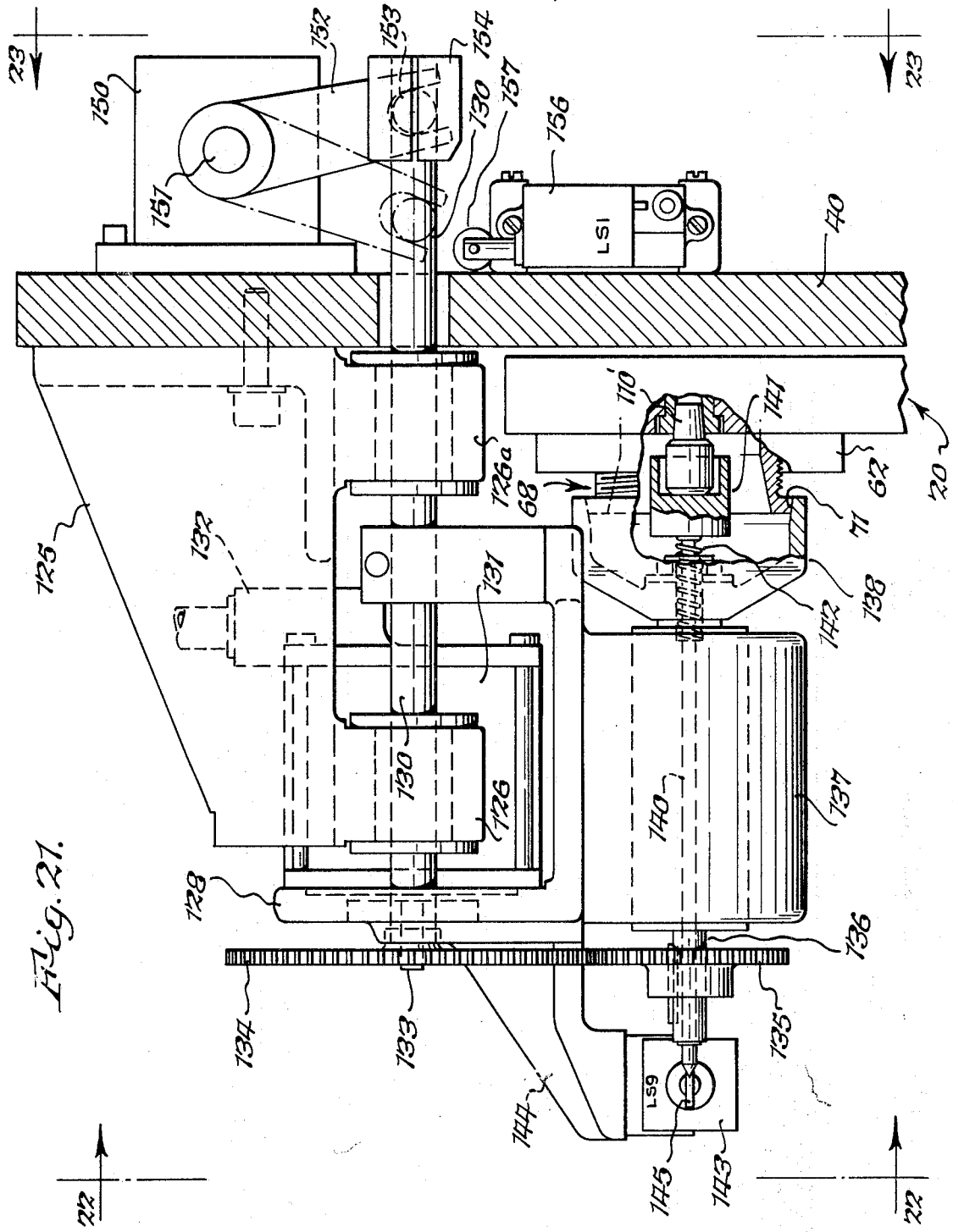

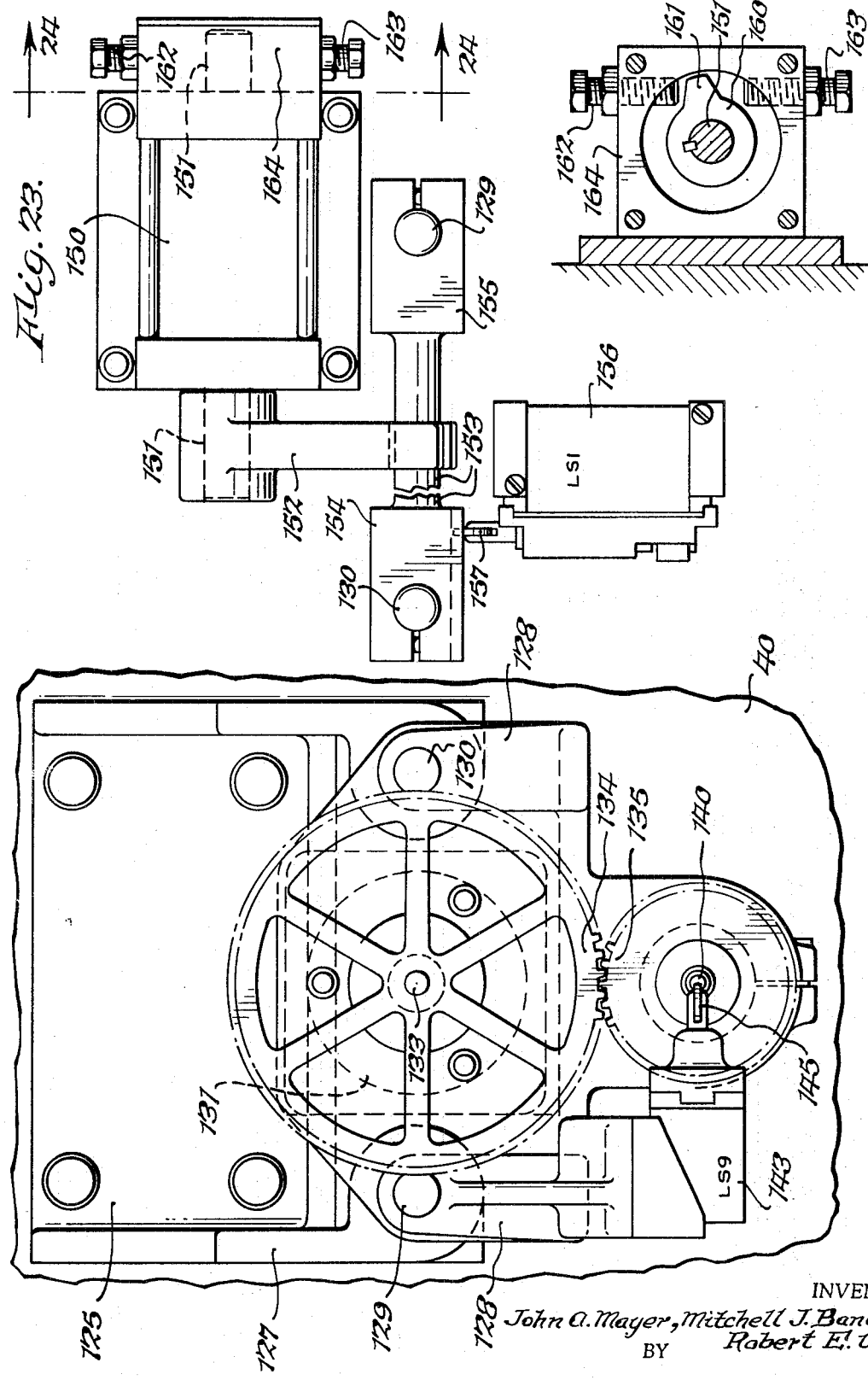

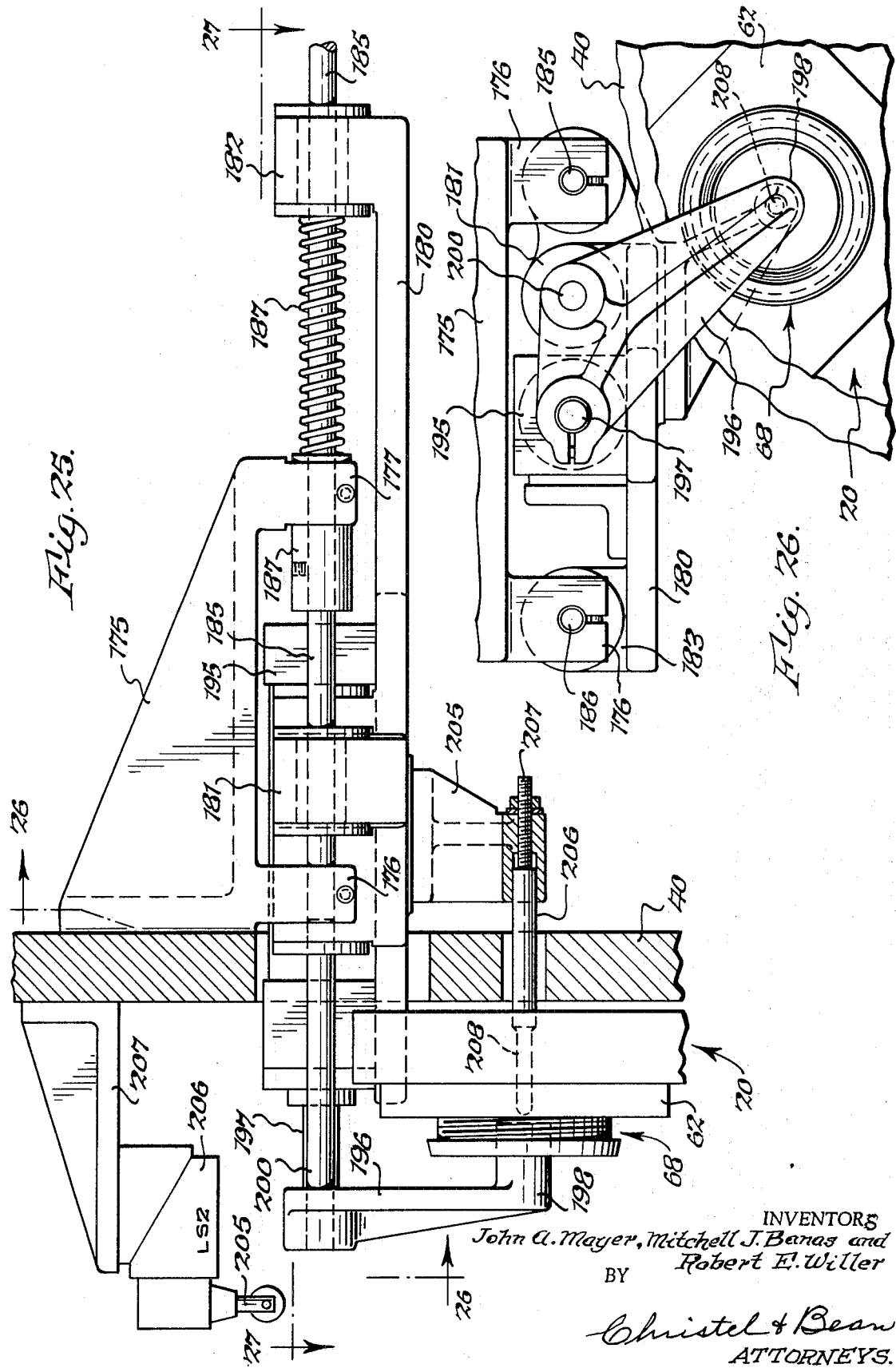

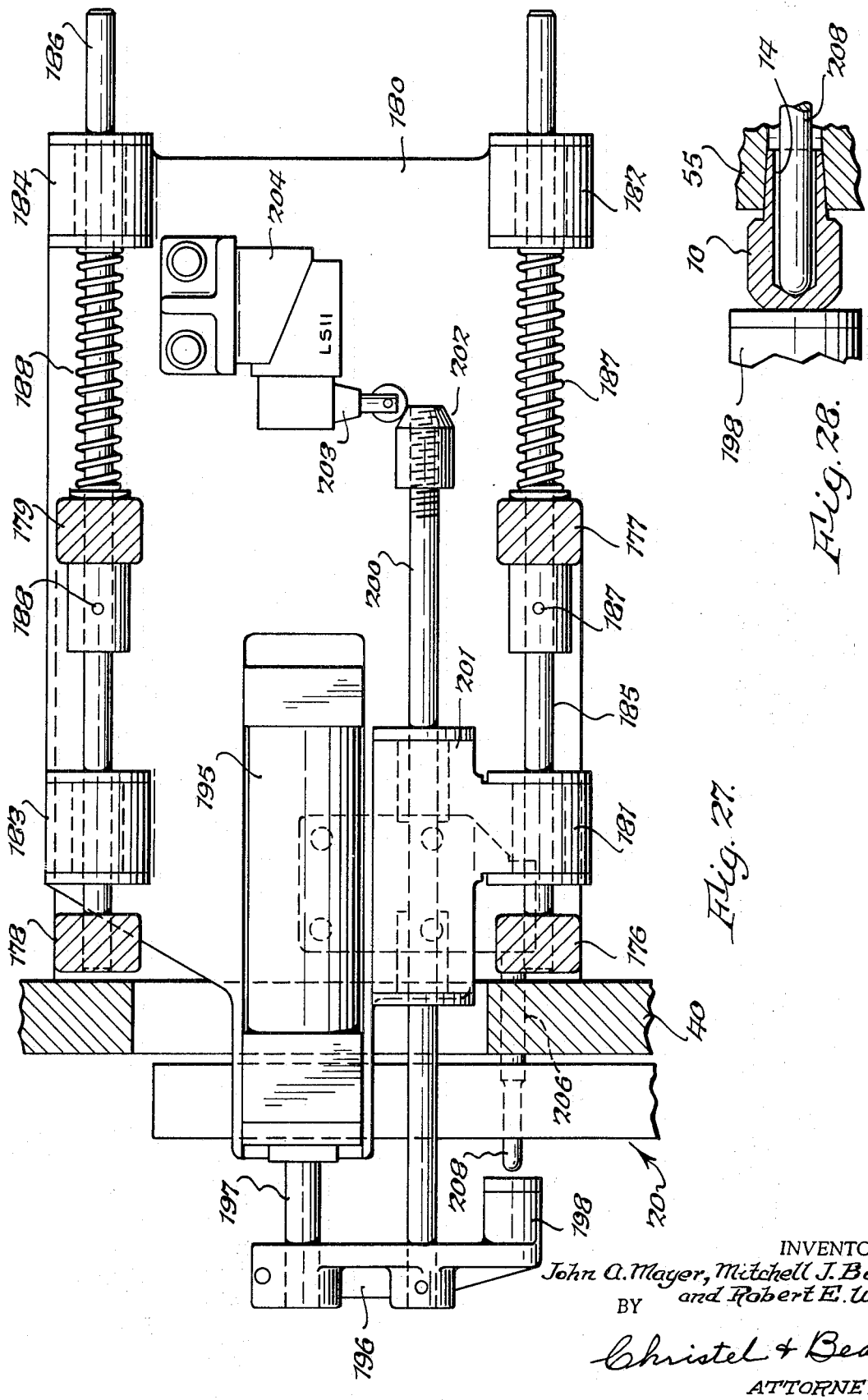

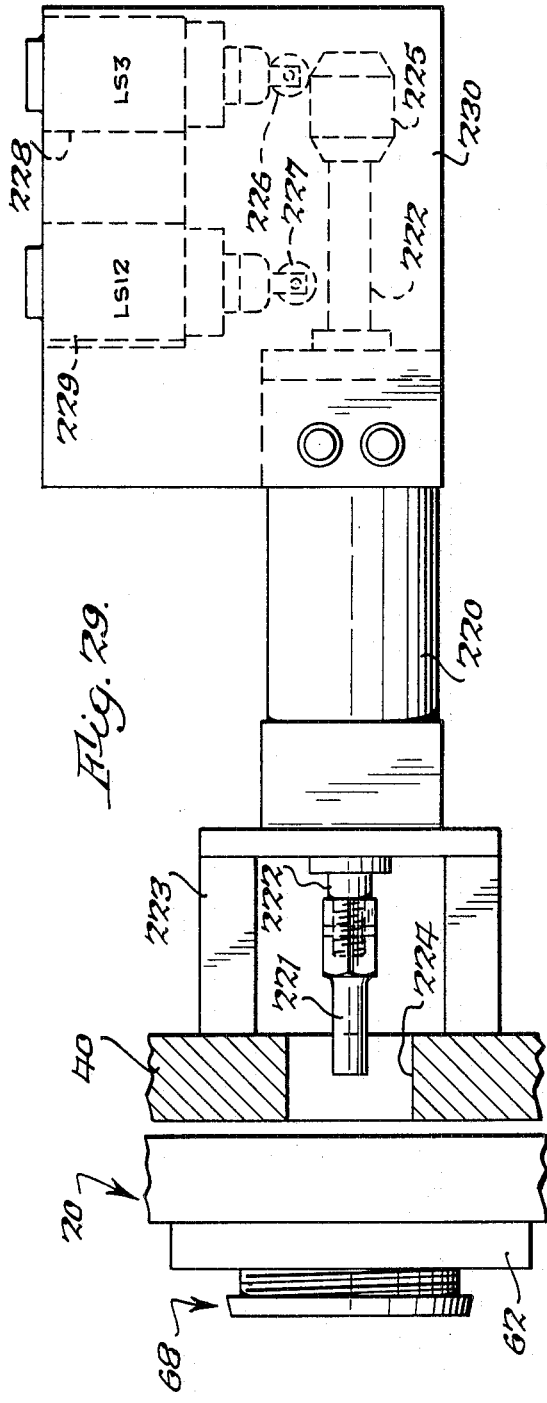
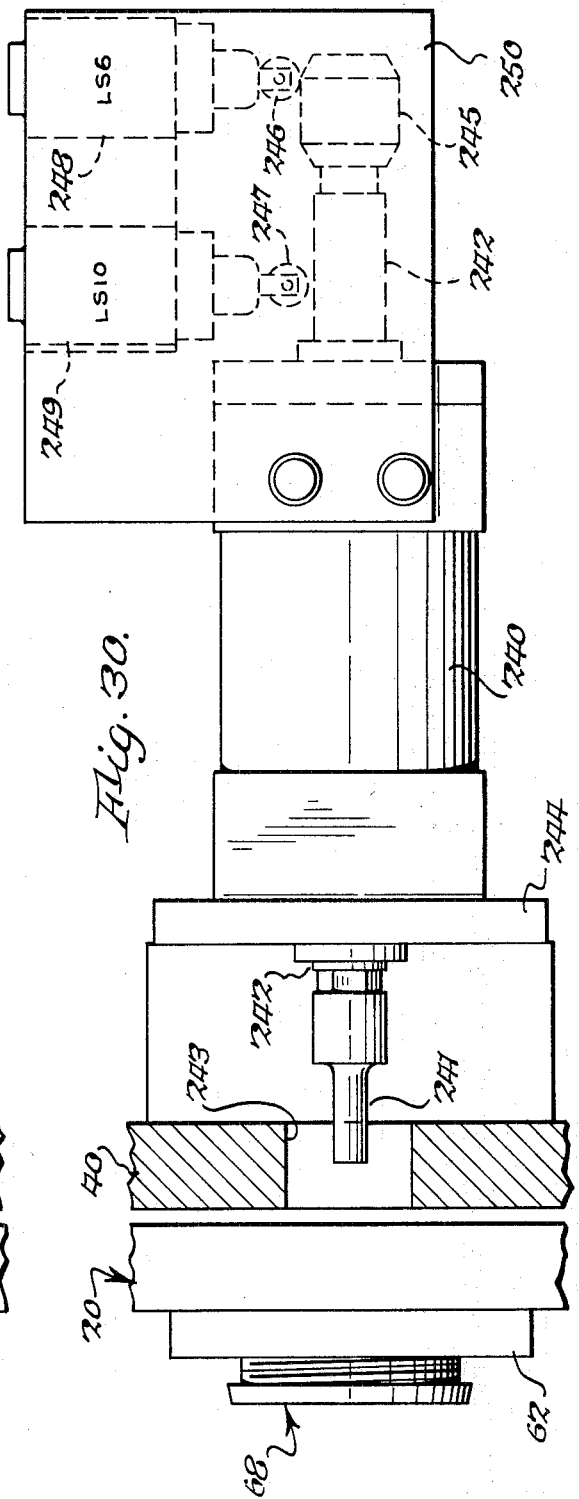

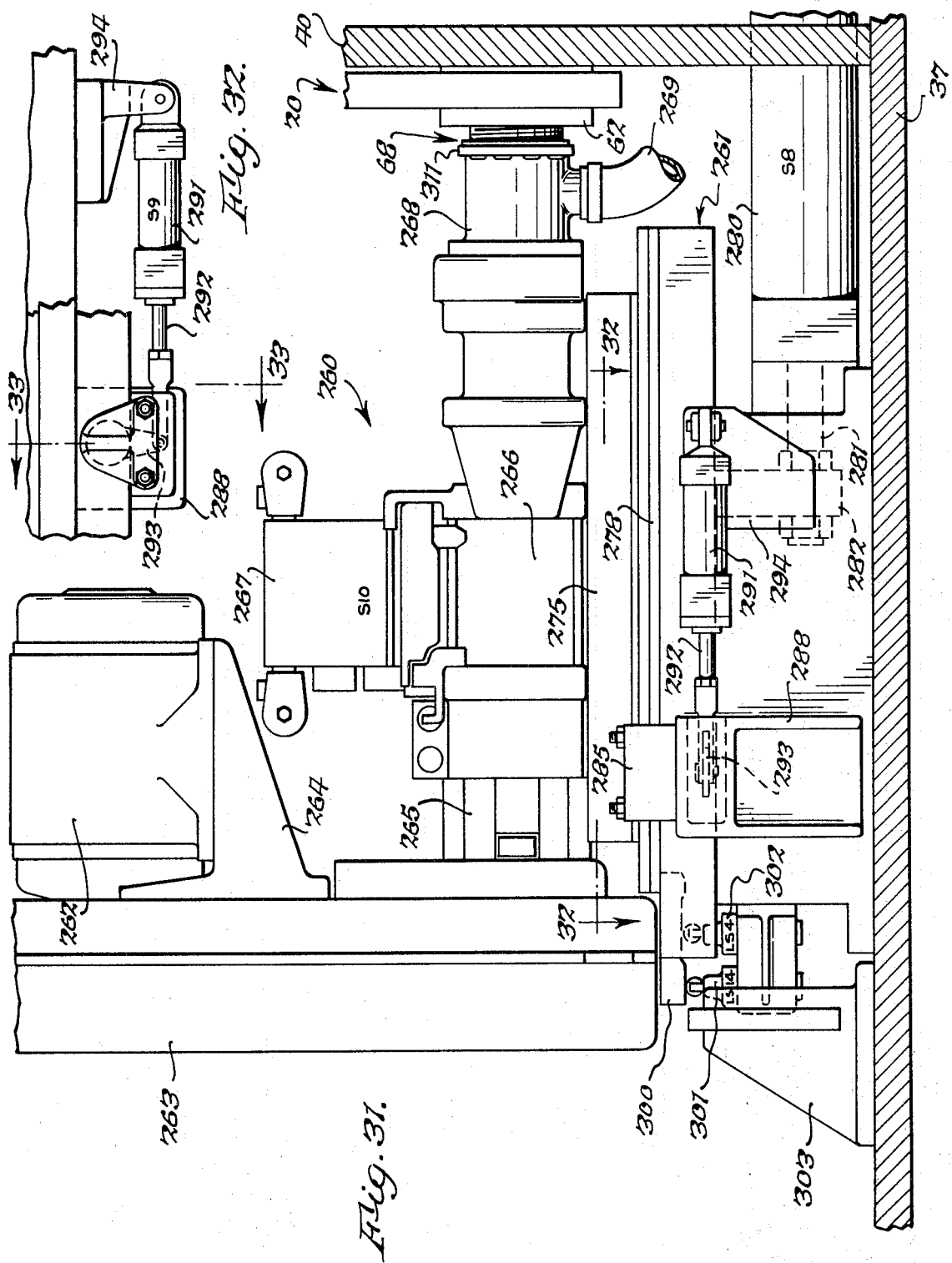

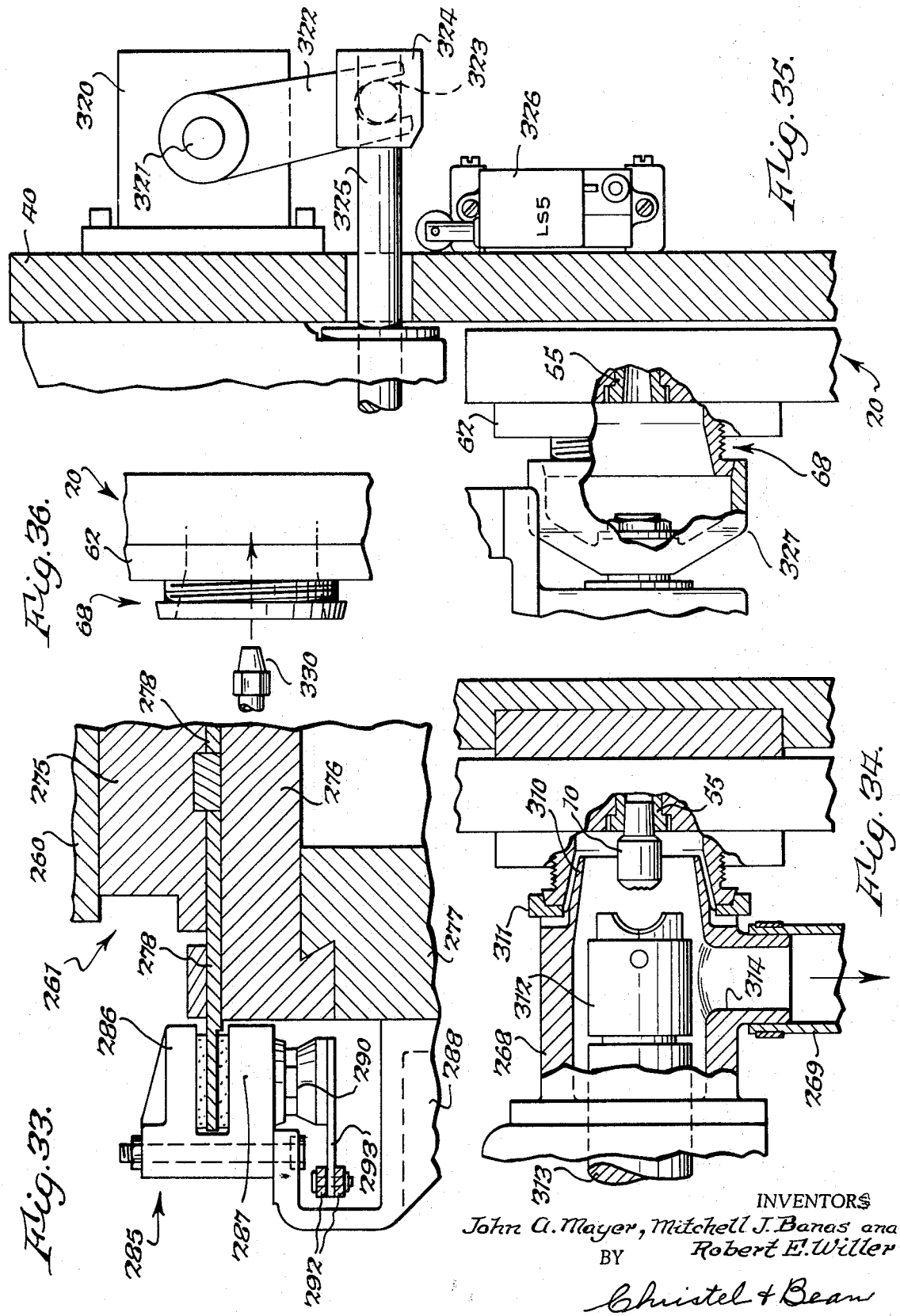

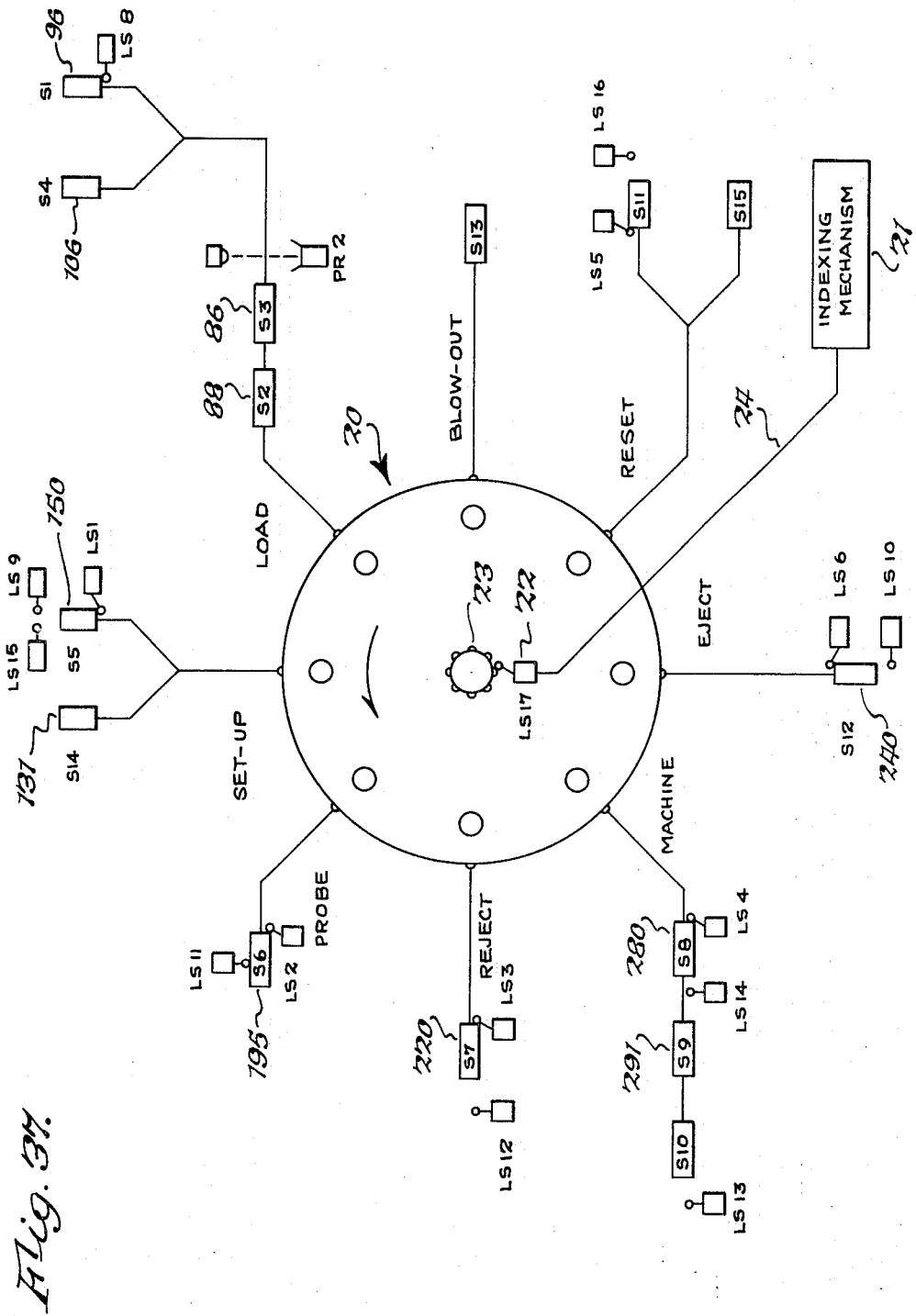

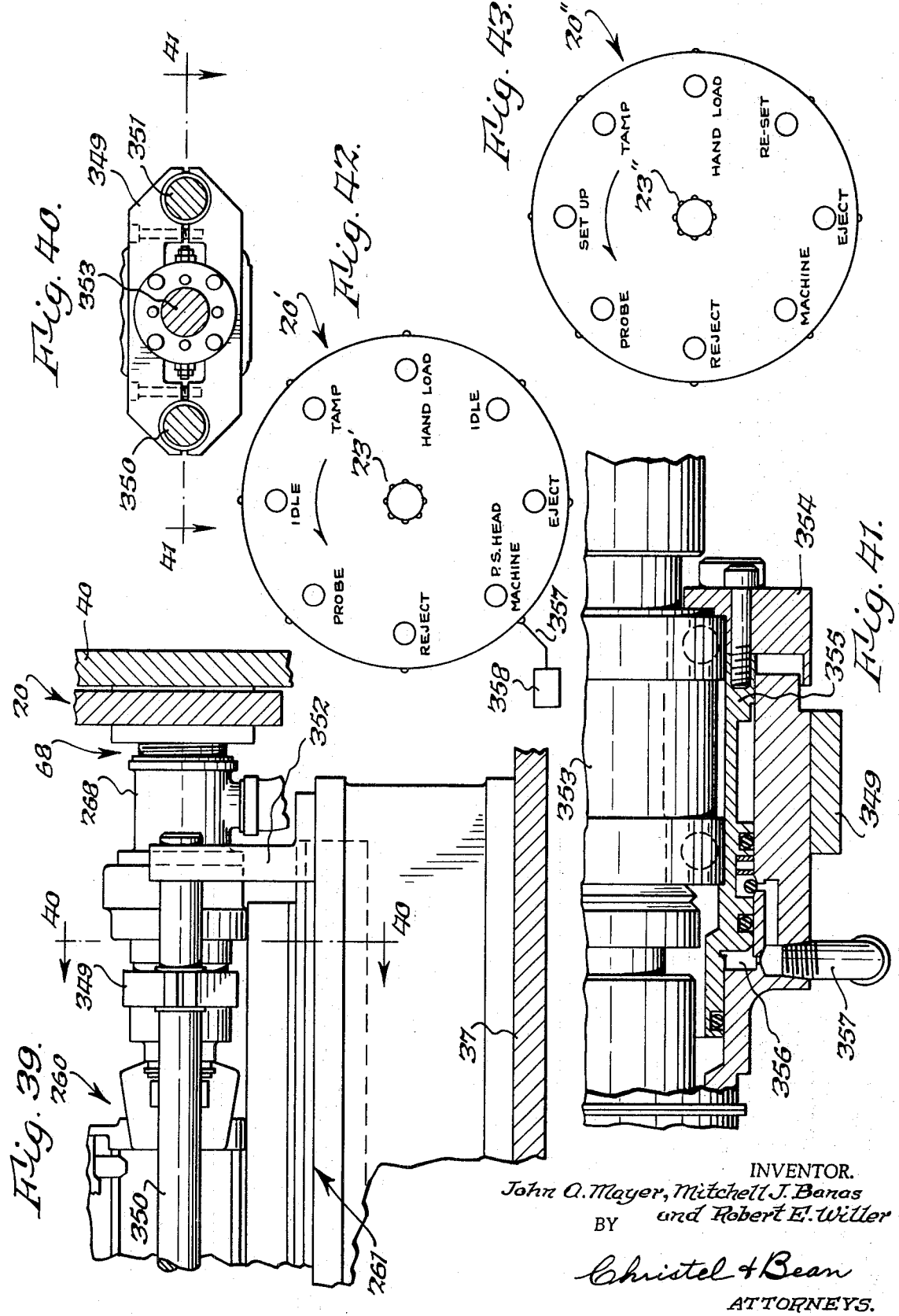

INVENTORS
John A. Mayer, Mitchell J. Banas
and Robert E. Willer
BY
Christel + Bean
ATTORNEYS.

MILLING APPARATUS FOR REMOVING A GIVEN AMOUNT OF MATERIAL FROM PARTS SATISFYING A GEOMETRIC REQUIREMENT

BACKGROUND OF THE INVENTION

This invention relates to milling apparatus and, more particularly, to apparatus for removing the same amount of material from one end of each of a plurality of parts and only if a particular geometric characteristic of the part satisfies a given requirement.

One area of use of the present invention is in the renewing or "dressing" of resistance welding electrodes by remachining the worn surfaces thereof. By way of illustration the present invention will be described with particular reference to "dressing" of welding electrodes, although the principles of the invention can be variously applied.

Welding electrodes are generally tubular in shape with a relatively thick end wall providing the operating surface at one end thereof. These electrodes also have an internal bore which extends through the opposite end in a direction generally parallel to the longitudinal axis and terminates in an end wall surface spaced from the operating surface. The internal bore receives a flow of coolant during welding.

Welding electrodes have been remachined or "dressed" by hand in conjunction with machines such as a lathe. Such semiautomatic operation is not completely satisfactory because it does not consistently result in proper alignment of the renewed operating surface with respect to the electrode longitudinal axis. When alignment is improper the electrode, in addition to not complying with safety regulations, produces a weld of inferior quality. If this operation could be performed entirely by machine, the characteristic consistency and speed of machines would provide the highly desirable and previously unobtainable results of a larger volume of finished parts consistently having proper alignment.

The peculiar requirements imposed on renewed or "dressed" electrodes, however, give rise to several challenging machine design problems needed to be solved before fully automatic operation could result. Safety regulations, for example, prohibit the remachining of any electrode in which the distance between the worn operating surface or end to be machined and the end wall of the interior recess is less than a predetermined, safe distance. To comply further with safety regulations and in order to prolong the electrode life as much as possible, it is required that only a predetermined or minimal amount of material be removed from the end of each electrode. This requirement renders machine design difficult because of the variations in length among electrodes. Moreover, since one and only one end of the electrode is to be machined, automatic feeding and loading of a plurality of randomly oriented electrodes into the machine, properly oriented, gives rise to another difficult problem.

SUMMARY OF THE INVENTION

It is, therefore, an object of this invention to provide a machine for removing a portion of the material at one end of a part so as to provide a properly finished and aligned surface at that end.

It is a further object of this invention to provide such a machine which will operate only on parts wherein the distance between the end from which material is to be removed and a point on the part spaced therefrom is equal to or greater than a predetermined amount.

It is a further object of this invention to provide such a machine wherein a predetermined or minimal amount of material will be removed from each part regardless of the length thereof.

It is a further object of this invention to provide such a machine wherein a plurality of randomly oriented parts are loaded therein and properly oriented with respect to the end which is to be machined.

It is a more particular object of this invention to provide a machine for "dressing" or remachining the worn surface ends of welding electrodes, so that the new surface is properly aligned, by removing only a predetermined or minimal amount of material from each electrode, regardless of length, and only from those electrodes having a given, safe amount of material at the worn surface end.

It is a further object of this invention to provide such a machine for receiving a plurality of randomly oriented electrodes and placing them in proper orientation for operation by the machine.

The present invention provides novel apparatus wherein a plurality of randomly oriented parts, only one end of each of which is to be machined, are received, the orientation of each is sensed, and those properly oriented are placed in a mechanism for conveying the parts through the operational stages or stations of the apparatus. The distance between the end to be machined, of each part, and a point on the part spaced therefrom is measured, and the apparatus operates further on only those parts in which the distance is equal to or greater than a predetermined amount. In one embodiment, the apparatus includes a milling machine of the type wherein the amount of material removed from each part depends upon the distance between the end of the part and a point on the milling machine housing. This distance is adjusted for each part so that a given amount of material is removed from each part regardless of the length thereof. In another embodiment, the apparatus includes a milling machine of the type wherein the number of revolutions of the rotary cutting mechanism included therein is controlled. Contact between the cutting mechanism and the part is sensed and initiates operation of the mechanism so that a given amount of material is removed from each part regardless of the length thereof.

These and other advantages and characterizing features of the present invention will become apparent from the following description of two illustrative embodiments thereof, considered in conjunction with the accompanying drawings wherein like numerals represent like parts throughout the various views.

BRIEF DESCRIPTION OF THE DRAWING FIGURES

FIG. 2 is a cross-sectional view thereof the apparatus taken about on the line 2—2 of FIG. 1;

FIG. 3 is an enlarged, fragmentary sectional view thereof taken about on line 3—3 of FIG. 2 and showing in detail a component of the part holding means provided by this invention;

FIG. 4 is an elevational view taken about on line 4—4 of FIG. 3;

FIG. 5 is an elevational view of a conventional welding electrode in new or unused condition;

FIG. 6 shows the electrode of FIG. 5 after being used;

FIG. 7 shows the electrode of FIG. 6 after being renewed or "dressed" by the apparatus of the present invention;

FIG. 8 shows an electrode which is rejected by the apparatus of the present invention because of its geometric characteristics;

FIG. 9 is an enlarged, fragmentary plan view of the apparatus of FIG. 1 showing the loading mechanism provided thereby;

FIG. 10 is a side elevational view of the loading mechanism shown in FIG. 9;

FIG. 11 is a fragmentary sectional view taken about on the line 11—11 of FIG. 10;

FIG. 12 is a sectional view taken about on line 12—12 of FIG. 9;

Figure 1:
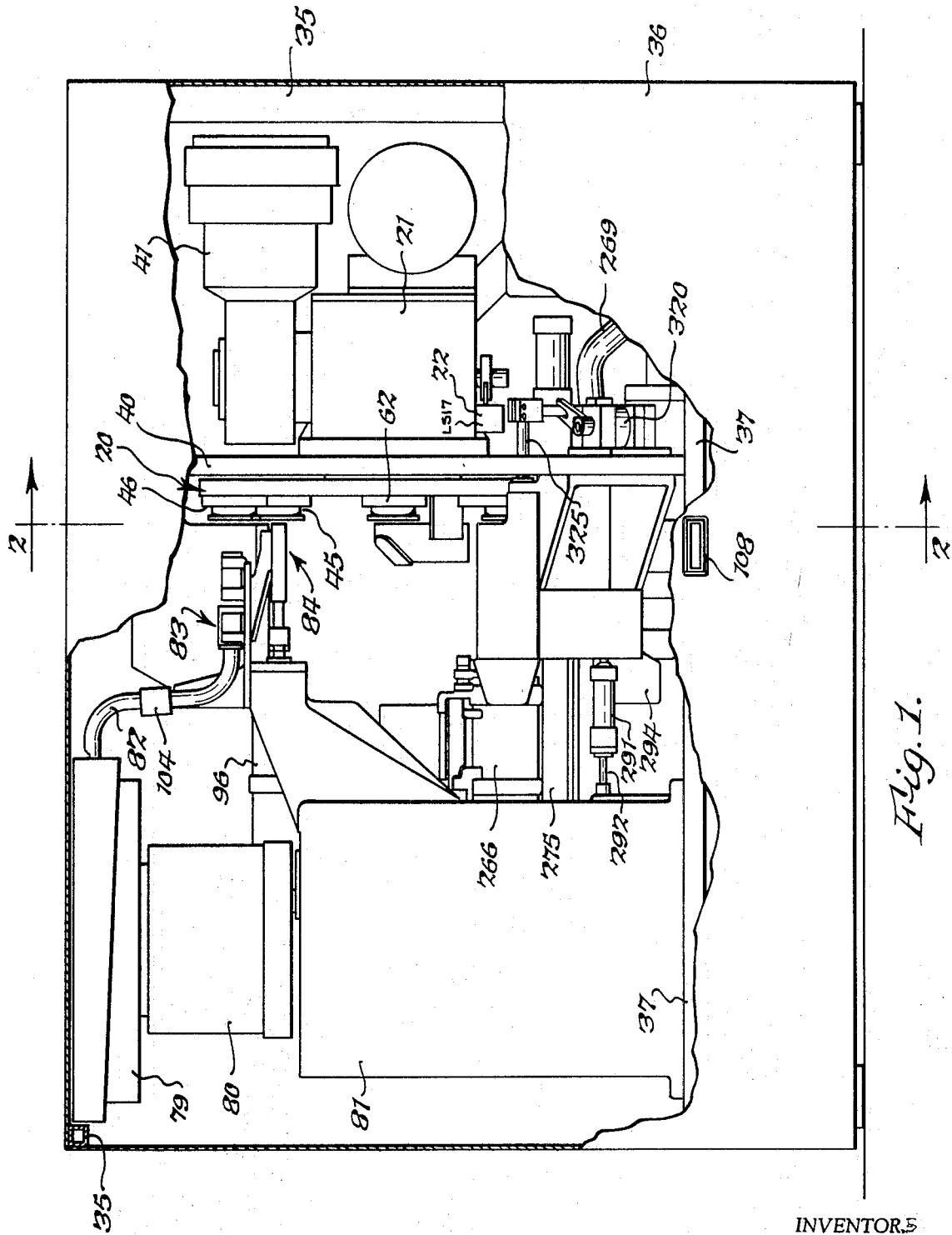
FIG. 1 is a side elevational view of an apparatus of the present invention with a portion of the housing removed.
Figure 38:
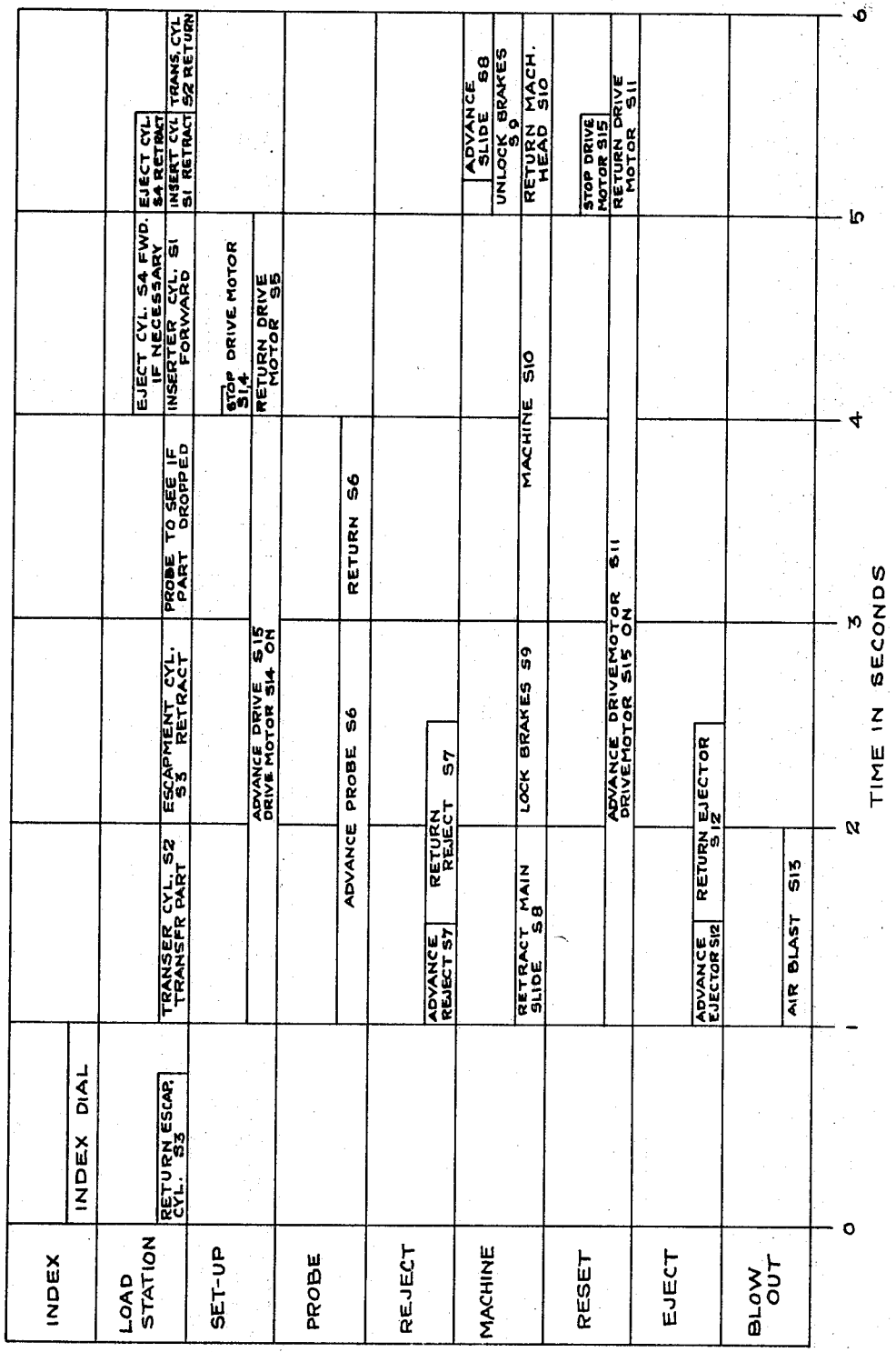
Figure 44:
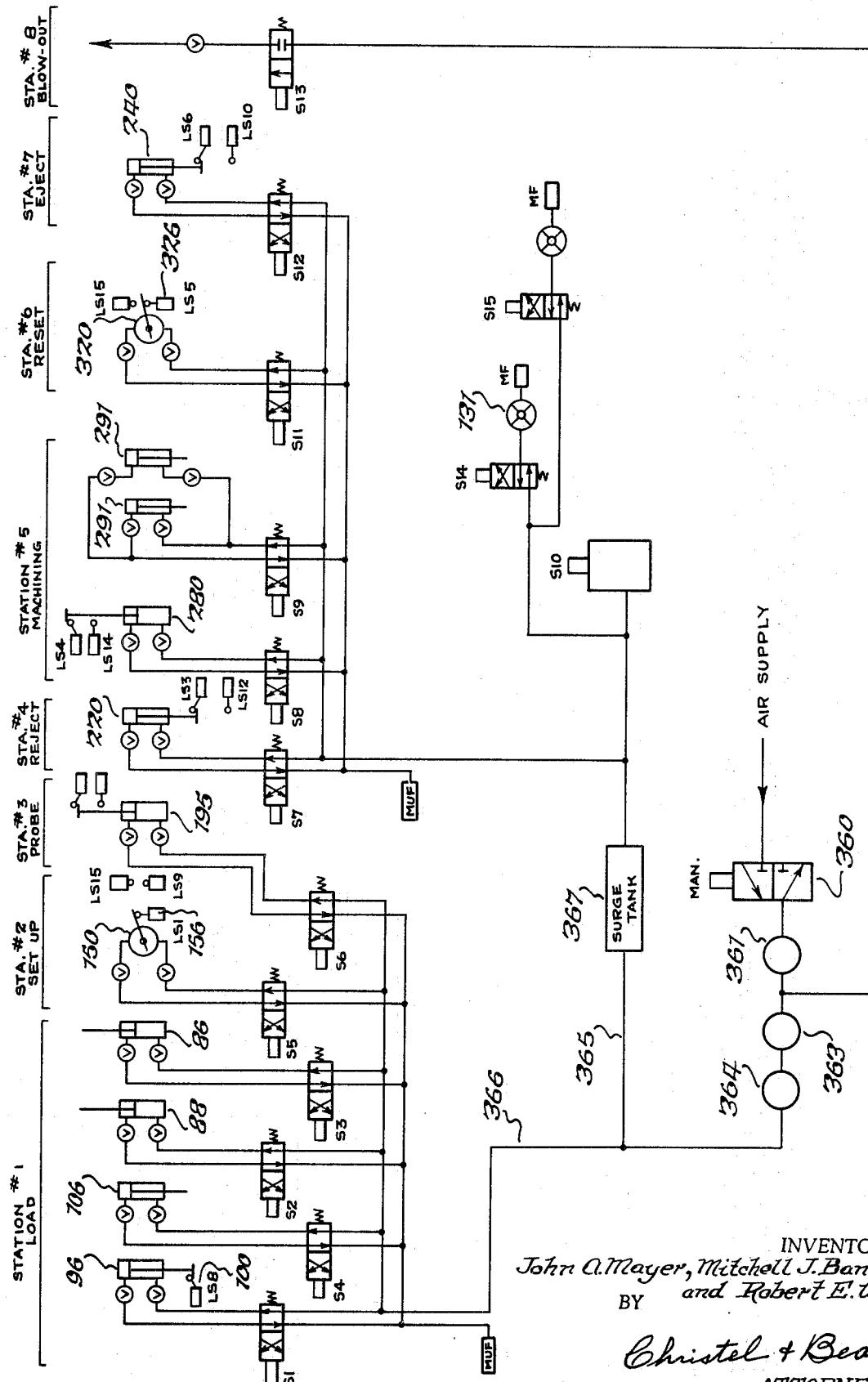

FIGS. 13—16 are schematic illustrations of the operation of a portion of the loading mechanism on a properly oriented part;

FIGS. 17—20 are schematic illustrations of the operation of the same portion of the loading mechanism on an improperly oriented part;

FIG. 21 is a fragmentary elevational view of a mechanism provided by this invention for insuring that the same amount of material is removed from each part regardless of the length thereof;

FIG. 22 is an elevational view thereof taken about on the line 22-22 of FIG. 21;

FIG. 23 is an elevational view thereof taken about on the line 23-23 of FIG. 21;

FIG. 24 is a sectional view thereof taken about on line 24-24 of FIG. 23;

FIG. 25 is a fragmentary elevational view of the probe mechanism included in the apparatus of FIG. 1;

FIG. 26 is an elevational view thereof taken about on line 26-26 of FIG. 25;

FIG. 27 is a fragmentary sectional view thereof taken about on line 27-27 of FIG. 25;

FIG. 28 is a schematic representation of the operation of a portion of the probe mechanism of FIGS. 25—27;

FIG. 29 is a fragmentary elevational view of a reject mechanism which can be included in the apparatus of this invention;

FIG. 30 is a fragmentary elevational view of an eject mechanism which can be included in the apparatus of this invention;

FIG. 31 is a fragmentary elevational view of the apparatus of the present invention showing the milling machine included therein;

FIG. 32 is a sectional view thereof taken about on line 32-32 of FIG. 31;

FIG. 33 is a sectional view thereof taken about on line 33-33 of FIG. 32;

FIG. 34 is an enlarged fragmentary view similar to FIG. 31 with parts removed;

Fig. 35 is a fragmentary elevational view showing a reset mechanism which can be included in the apparatus provided by this invention;

FIG. 36 is a fragmentary elevational view showing an arrangement for cleaning the holding means included in the apparatus of this invention;

FIG. 37 is a schematic representation of the various operations performed by the apparatus of this invention on a part during a cycle;

FIG. 38 is a timing diagram of the various operations represented in FIG. 37;

FIG. 39 is a fragmentary elevational view of a modification of the apparatus of this invention;

FIG. 40 is a sectional view thereof taken about on line 40-40 of FIG. 39;

FIG. 41 is a sectional view thereof taken about on line 41-41 of FIG. 40;

FIGS. 42 and 43 are schematic representations of the various operations performed by the modified apparatus of this invention on a part during a cycle; and FIG. 44 shows a fluid circuit for controlling and operating various components of the apparatus of this invention.

DETAILED DESCRIPTION OF THE ILLUSTRATED EMBODIMENTS

The apparatus provided by this invention, in general, may be used to remove a given amount of material from one end of a part of machinable material regardless of its length and only if the part has a given geometric characteristic. One particularly advantageous use of the apparatus is for remachining or "dressing" welding electrodes, and a conventional electrode 10 in new or unused condition is shown in FIG. 5. It includes a generally cylindrical body portion 11 having an operating surface 12 at one end, in this particular illustration at the left-hand end, and a generally narrower and tapered portion 13 at the other end thereof. A bore 14 is provided in the interior of the electrode for receiving a liquid coolant such as water. FIG. 6 shows such an electrode after having been used in welding for a particular time, and the most apparent difference is that the outermost end of the operating surface, here designated 12', is worn away. FIG. 7 shows the same electrode after having been remachined or "dressed" by the apparatus provided by this invention. The operating surface, here designated 12", is again substantially of the same shape as that of the new electrode shown in FIG. 5, but a portion of the cylindrical portion 11 has been removed with the result that the overall length of the electrode is slightly reduced. FIG. 8 shows an electrode 10''' which does not satisfy safety requirements in that the distance between the worn surface end, here designated 16, and a particular point spaced therefrom, in the present instance the inner end wall 15 of the recess 14, is less than a predetermined, minimum amount. One important feature of the apparatus of the present invention, as will be explained presently, is that this critical distance is sensed or measured for each electrode and only those electrodes in which this distance is equal to or greater than a predetermined amount will be operated on. In addition, to comply with safety regulations and to insure that the electrode life is prolonged as much as possible, it is required that only a predetermined or minimum amount of material be removed from the electrode. Another important feature, therefore, is that the apparatus of the present invention removes the same, predetermined amount of material from each electrode regardless of the length thereof.

A brief description of the various functions provided by the apparatus of the present invention will facilitate an understanding of the structure and overall operation thereof. Referring momentarily to FIG. 37, there is seen schematically represented a holding means 20 which grips the parts to be machined, such as the welding electrodes previously described, and moves the parts to and from various stations in the machine at which particular mechanisms operate on the parts. The holding means 20 preferably carries the parts through a circular path under the operation of controlled drive means (not shown) which move the means 20 through various increments at predetermined intervals. An indexing mechanism, indicated schematically at 21, initiates operation of the various mechanisms in response to the arrival of the parts at the stations by means of the movements of the holding means 20. One particular arrangement for sensing these movements includes a limit switch 22 which is activated by a plurality of stops 23 provided on the holding means. The limit switch, in turn, is connected through line 24 in controlling relation to the indexing mechanism 21. Thus, as the parts are taken through each increment of the path, in this example a circular path, the indexing mechanism 21 functions, under control of the limit switch 22, to initiate operation of the mechanisms at the various stations in the machine in response to the arrival of the part at the stations. It should be noted that the arrangement of switch 22, stops 23 and line 24 are merely illustrative of many various arrangements whereby the arrival of a part at a station, caused by movement of the holding means, is indicated and communicated to the indexing mechanism, which arrangements would be included within the spirit and scope of the invention.

In FIG. 37 eight stations are identified at which various operations are performed on the part. The particular mechanisms for performing these operations, however, are not shown, but various components such as fluid cylinders controlled by solenoid-operated valves and limit switches which control the operation of these mechanisms are represented schematically. The operation of these components will be described further on in the specification. The first or "load" station is indicated generally at the upper right-hand corner of the diagram. At this station the parts are transported from a storage means and those parts which are properly oriented are loaded into the holding means 20 so as to be firmly gripped thereby, whereas the remaining parts are rejected and reconveyed to the storage means. In a counter-clockwise direction around the diagram, the next or second station is designated "setup". Here an adjustment is made in the distance between the end of the part, such as a welding electrode, which is to be machined and the end of a stop member which limits the travel toward the part of the mechanism which performs the machining operation as will be described in more detail hereafter. This adjustment insures that the same amount of material will be removed from each part regardless of length. At the next or "probe" station the distance between the end of the part to be machined and a point spaced therefrom on the part is sensed or measured. If this distance is less than a predetermined amount, the part is removed from the holding means 20 at the next or "reject" station. If the distance is sufficient, however, the end of the part will be machined at the fifth or "machine" station shown in the lower left-hand corner of the diagram. At the next or "eject" station the finished part is removed from the holding means, and at the following or "reset" station the aforementioned stop member is readjusted to a predetermined starting point. At the final station, designated "blowout", extraneous matter remaining in the holding means after the machine operation is removed.

In the particular embodiment illustrated in FIG. 37, the amount of material removed from the part is determined by the distance between the milling machine housing and the end of the part. This, in turn, is controlled by the setting of the stop member which setting is performed at the second or "setup" station. In an alternative embodiment, as will be described presently, the milling machine is provided with means for indicating the start of the cutting operation, and the amount of material to be removed is determined by controlling the number of revolutions of the machine cutting mechanism. As a result, the "setup" and "reset" stations can be eliminated. The last or blowout stage also can be eliminated if, during the machine operation, all of the extraneous matter is removed from the holding means. In addition, if it is desired to load the machine by hand, the mechanisms at the load station likewise can be eliminated.

In FIG. 1, the apparatus provided by this invention is shown positioned within a supporting frame 35 to which is attached a suitable enclosure 36 preferably including portions of transparent plastic, the remaining portions being of metal. A base 37 is also provided within frame 35. A dividing frame 40, disposed vertically and located approximately in the middle of the enclosure as shown in FIG. 1, may be viewed conveniently as a reference in orienting the various mechanisms of the apparatus. Positioned slightly to the left of frame 40 in this illustration is the holding means 20 which, in preferred form, is a vertically disposed disc member of "dial" which will be described in more detail presently. Disc 20 is rotated incrementally in a controlled manner by a drive means 41 through a suitable motion transmitting arrangement which would include a shaft extending through frame 40 and connected to disc 20. Drive means 41 includes motor, clutch, and brake components. The indexing mechanism 21 is located near the drive means 41 and in close proximity to holding means 20 for sensing incremental movement thereof with the aid of switch 22 as described.

The indexing mechanism 21 is a commercially available unit marketed under the name, Ferguson "Transpac". Since such units are readily commercially available and well-known in the art, a detailed description thereof is deemed unnecessary. Briefly, the mechanism 21 would include a plurality of cams which would be rotated under control of switch 22 each time the holding means 20 takes the part to a station. The cams actuate switches in electrical circuits causing the operation of corresponding solenoid-operated valves to control the operation of various mechanism at the stations in the apparatus. The timing is determined by the rotational orientation of the cam lobes, in a conventional manner. The operative arrangement of and connections between the solenoid-operated valves and some of the mechanisms is shown in the fluid circuit diagram of FIG. 44 which will be referred to presently.

As shown in FIG. 1, the drive means 41 is advantageously employed to rotate both the cams in the indexing mechanism 21 and the holding means 20. The drive to the indexing mechanism 21 is continuous and cams therein control the timed, periodic operation of conventional clutches and brakes which provide a driving connection to the holding means 20. Alternatively, the holding means could be driven by separate controlled drive means, the requirement being that the timing thereof be properly synchronized with the operation of the indexing mechanism. These and other alternative arrangements for driving the holding means 20 and indexing mechanism 21, in the described required manner, will be apparent to one skilled in the art without detailed description and are intended to be within the spirit and scope of the invention.

The holding means 20 provided by this invention is shown in more detail in FIGS. 2—4. As previously mentioned it is preferably disc-shaped and provided with a plurality of gripping means in the form of chucking devices 45—52. In this particular illustration eight such devices are provided. A shaft, designated 52 in FIG. 2, connects the holding means 20 to the controlled drive arrangement previously explained. The provision of the chucking devices around the periphery of a disc-shaped member advantageously permits accommodation of a relatively large number of stations in a reasonably small and compact area.

FIGS. 3 and 4 illustrate in more detail the structure of each of the gripping means or chucking devices contemplated by this invention. As shown in FIG. 3, the tapered portion 13' of a part 10' to be machined is snugly received in a tapered bushing 55 which fits into an aperture 56 provided in the disc member 20, and which is held against reciprocal movement by the engagement between suitable fastening means such as screw 57 and an extension 58 of the bushing. The bushing 55, while generally cylindrical, has a planar portion 59, shown at the lower portion thereof in FIG. 4, which firmly abuts two bolt members 60, 61 to prevent rotational movement of the bushing. A plate 62 is secured to the disc member 20 on the side thereof from which the end to be machined of the part 10' projects, and has a threaded aperture 63 provided therein which is concentric with and substantially larger in diameter than the aperture 56 in the member 20 and which receives the bushing 55. Plate 62 is secured to disc 20 by suitable fastening means such as screws 64. A cylindrical stop member 68 is threadably received in the aperture 63 and an annular groove or recess 69 is provided in disc member 20 so that stop member 68 upon rotation thereof may be reciprocated relative to the end of the part 10'. The member 68 is provided with a tapered inner surface 70 for snugly receiving the end of a milling machine as will be described hereafter, and is provided with an oppositely directed, outwardly tapered surface 71 to facilitate gripping thereof by the adjusting means as will also be described. Member 68 is firmly but adjustably held in position by a friction disc 72, and the outward travel thereof is limited by a laterally projecting clamp plate 73 bolted thereto.

The tapered bushing 55, known in the art as a Morriss taper, was found to be particularly advantageous in gripping the tapered end 13' of a welding electrode to be machined. It should be noted, however, that other devices for gripping parts at one end thereof, opposite the end to be machined, and which can be conveniently carried in a movable member such as the member 20, may be substituted for the bushing 55 without departing from the spirit and scope of this invention. Likewise, the provision of a cylindrical stop member 68 in close proximity to and surrounding the part to be machined was found desirable from the standpoint of a compact arrangement, but other structures and locations for the stop member could be employed, as will be evident from a further reading of the specification, without departing from the spirit and scope of this invention.

While the simplified structure of the holding means and the gripping means or tapered bushings provided therein would enable easy hand loading of parts to be machined, this invention advantageously provides a mechanism for automatically loading the parts, in proper orientation, from a storage means into the holding means. It will be recalled that automatic loading occurs at the first station shown in the schematic diagram of FIG. 37. The parts, for example welding electrodes, are placed in large quantities in a hopper 79 vibrated by a unit 80 mounted on supporting member 81 which feeds the parts to a gravity chute or conduit 82 which conveys them toward the holding means 20 as shown in FIG. 1 and in more detail in FIGS. 9—20. The hopper and vibrating unit can be of a readily commercially available type such as that known as the "Syntron" unit. After traveling down the conduit 82, the parts arrive at and enter a first part receiving station or chamber 83. A second part receiving station or chamber 84 is located so as to be in communication with a gripping device on holding means 20. There is also provided a translating means including escapement fluid cylinder 86 for reciprocating a probe 87 connected to the cylinder rod, and a transfer cylinder 88 operatively connected to cylinder 86 through rod 89. Cylinder 86 is fixedly attached to bracket 90 which is movably connected to a bracket 91 through slide rods 92, 93. Cylinder 88 is mounted at one end to bracket 91 which, in turn, is fixed in a suitable manner relative to the entire apparatus. The function of the translating means is to move the part from the first to the second receiving station when the part is oriented in a first or proper direction and to leave the part in the first station 83 when it is oriented in a second or improper direction. As illustrated in FIGS. 13 and 14, a part has traveled down through the conduit 82 and into the first station or chamber 83. Under control of index mechanism 21, a solenoid valve S-3 operatively connected to cylinder 86 as shown in FIG. 44 activates the cylinder 86 so that the probe or rod 87 is extended. With the part properly oriented as shown in FIGS. 13 and 14, probe 87 extends into the recess 14 and engages the part in station 83. Another solenoid valve S-2 shown in FIG. 44 is then operated by index mechanism 21 to activate and extend cylinder 88. This, in turn, moves cylinder 86 and extended probe 87 so as to transfer the part along chamber or station 83 as shown in FIG. 15. Next, solenoid valve S-3 again is operated to retract cylinder 86, withdrawing probe 87 from the part which causes it to fall down a chute 95 and into the second station or chamber 84 as shown also in FIG. 10.

The part will be oriented properly in station or chamber 84, that is, the tapered end of the part will be directed toward the holding means 20. At this point another solenoid valve S-1, as shown in FIG. 44, is activated by index mechanism 21 and, in turn, operates a tamping means in the form of air cylinder 96 operatively connected through rod 97 to a plunger 98. Plunger 98 travels forward, or to the left in FIG. 10, to push the part into the corresponding gripping means or tapered bushing 55 in holding means 20 with the force required to provide a snug fit as shown in FIG. 11. Plunger 98 is then withdrawn by a spring 99 connected to pin 84' and to the rod 97. The return of plunger 98 is indicated by a switch 100, the actuating member 101 of which is tripped by an arm 102 on plunger 98.

A sensor 105 is located in proximity to the station 84. It may be of any suitable variety such as the photoelectric type and functions in the following manner. The previously described sequence occurred with a properly oriented part. The vibrating hopper, however, is not effective to deliver the parts oriented properly all of the time. For example, the next part to travel down the conduit 82 as shown in FIG. 17 is not properly oriented, and when cylinder 86 is again extended in response to the operation of solenoid valve S-3, probe 87 will merely push the part back into the conduit. Then when solenoid valve S-2 again operates to extend cylinder 88, probe 87 will again be moved along the chamber 83, but the part will not be transferred therewith but rather will remain at its arrival position in chamber 83 as shown in FIG. 19. Since no part travels down the chute 95 into chamber 84, sensor 105 will not be activated. An absence of an indication from sensor 105 operates another solenoid valve S-4 which, in turn, operates an eject cylinder 106 and plunger 107 connected thereto which removes the part from the chamber as shown in FIG. 20. The cylinder 106 is supported by bracket 91 as shown in FIG. 9. The ejected parts pass from the machine through a conduit 108, open at one end of the machine as shown in FIG. 1, and can be collected in a suitable container and replaced in the vibrating hopper 80 at a later time. A proximity sensor 109 is located approximately midway along conduit 82 and functions to shut off the vibrating hopper 80 when parts have backed up to the level of the sensor in the conduit.

Upon completion of the loading operation holding means 20 is then rotated, as previously described, through an increment so that the part will be at the "setup" station. This movement and arrival of the holding means causes indexing means 21 to begin the operation of the mechanism shown in FIGS. 21—24. This mechanism includes, briefly, a tapered drive wheel which is moved by a carriage to embrace the tapered outer surface of stop member 68 and rotate the member until the end thereof and the end to be machined on the part are in a predetermined, precise relationship. A supporting bracket 125 is fixedly secured to the frame 40 and is provided with depending portions 126, 127 and spaced relation at each side thereof. A carriage member 128 is connected to rods 129, 130 which, in turn, are supported by portions 126, 127 of bracket 125 in a manner so as to be reciprocable therethrough. Carriage 128 supports a fluid motor 131, preferably an air motor, having a supply conduit 132 connected thereto. The air motor output shaft 133 is connected to a gear 134 which, in turn, meshes with a gear 135. Gear 135 is connected to the input shaft 136 of a Gilman spindle 137 which can be considered an arrangement of preloaded bearings. Spindle 137 is fixedly attached to bracket 128 and is drivingly connected to a tapered drive wheel 138 which, as shown most clearly in FIG. 21, is provided with a tapered inner diameter of sufficient size to firmly embrace the outer tapered surface 71 of stop member 68. The shaft 136 is hollow so as to receive a shaft 140 positioned within and reciprocable relative to gear 135, spindle 137, and drive wheel 138. In the vicinity of the drive wheel, a cup-shaped sensing member 141 is connected to the end of shaft 140 and is of a size smaller in diameter than drive wheel 138. A biasing spring 142 is positioned on shaft 140 and connected to cup 141 and to spindle 137. The other end of shaft 140 is tapered and located in proximity to a limit switch 143 which, in turn, is connected to a frame member 144 which is stationary relative to the movable arrangement of carriage, gears, spindle and drive wheel. Switch 143 is actuated when the tapered end of shaft 140 engages a member 145 on the switch.

The carriage 128, air motor 131, gears 134 and 135, spindle 137, drive wheel 138, and member 141 are moved toward and away from holding means 20 by similar movements of rods 129, 130. The rods, in turn, are moved by a rotary actuator 150 which is fixedly attached to frame member 40 as shown in FIG. 21. Actuator 150 is of a fluid-operated type, such as that commercially designated "Tork-Mor". The output shaft 151 of actuator 150 is connected to an arrangement of a link 152 and pin 153 whereby the limited rotary output motion of the actuator 150 is converted to limited reciprocatory motion of the rods 129, 130. As shown more clearly in FIG. 23, link 152 is pivotally connected to pin 153 which, in turn, is connected through suitable members 154, 155 to the rods 129 and 130, respectively. A limit switch 156 is fixedly attached to frame member 40 and disposed so that an actuating member 157 is contacted by the member 154 as the rods are moved through a given distance.

The output motion of actuator 150 is limited by an arrangement shown in FIG. 24 which includes a cam 160 provided with a single lobe 161 which abuts the ends of bolts 162, 163 as cam 160, which is attached to shaft 151, is rotated. The cam, bolts and shaft are included within a suitable housing 164, and it should be noted that the limits are adjustable by a simple rotation of either or both of the bolts 162, 163.

The mechanism thus described operates in the following manner. The arrival of a part at this station by a movement of the holding means is sensed by the index mechanism 21 in conjunction with switch 22 which, in turn, activates a solenoid valve S-5, shown in FIG. 44, which operates rotary actuator 150. The actuator moves rods 129, 130 and, hence, carriage 128 in a direction toward holding means 20, as shown in FIG.

21. Air motor 131 has been turned on by the operation of a solenoid valve S-14 under control of indexing means 21. The output motion of motor 131 is transmitted through gears 134, 135 and spindle 137 to tapered drive wheel 138 which, as it engages stop member 68 rotates it in a direction to move the stop further into plate 62. Also, as carriage 128 is moved toward holding means 20, cup member 141 contacts the end of the part 10', and then becomes stationary relative thereto. This, in turn, causes the shaft 140 to move to the left in FIG. 21 whereupon it contacts the actuating member 145 of limit switch 143 at the instant when stop member 68 has reached the predetermined position. This position may be varied simply by adjusting the location of member 145. Operation of switch 143 causes solenoid valve S-5 to operate actuator 150 in a reverse direction so as to withdraw carriage 128 in a direction away from holding means 20. The return of carriage 128, in turn, trips switch 156 and the resulting signal can be used, for example, to command solenoid valve S-14 to turn off air motor 131.

By virtue of this arrangement, stop member 68 is given a predetermined adjustment regardless of the length of the part to be machined. Variations in length among the parts are compensated for by the provision of member 141 and shaft 140 which are movable relative to the remaining components of the mechanism which travel with carriage 128.

After completion of the "setup" operation, holding means 20 is again indexed through another increment whereupon the part 10' is taken to the "probe" station, it will be recalled that only those welding electrodes having a sufficient distance between the end to be machined and the inner end wall 15 of cooling bore or recess 14 may be remachined or "dressed". A mechanism provided by this invention for sensing this distance is shown in FIGS. 25—28 and includes a supporting bracket 175 fixedly secured to frame member 40. Bracket 175 is provided with depending portions 176—179 spaced apart relative to each other as shown more clearly in FIG. 27. A movable or "floating" platform 180 is horizontally disposed and located slightly below the depending portions of bracket 175. Platform 180 is provided with four upstanding leg portions 181-—184, and the platform is connected to bracket 175 by means of two supporting rods 185, 186 which extend through corresponding apertures provided in the bracket depending portions and platform leg portions. First and second springs 187, 188 are located on rods 185, 186 between corresponding bracket and platform leg portions so as to urge platform 180 normally away from holding means 20. The rods 185, 186 are anchored in bracket portions 177, 179 by suitable means such as screws 187, 188.

A motive power means in the form of fluid cylinder 195 is fixedly attached to platform 180. A sensing member in the form of arm 196 is operatively connected to the cylinder 195 through rod 197. Arm 196 is provided with a portion 198 which is disposed so as to be moved into engagement with the end of the part 10' to be machined as shown more clearly in FIG. 28. A rod 200 is connected at one end to sensing arm 196 and extends generally parallel to the axis of cylinder 195 through frame 40 and through an upstanding portion 201 of platform 180. Rod 200 orients and supports sensing arm 196 relative to the rest of the mechanism. In addition, rod 200 in conjunction with an enlargement 202 at the other end thereof moves with sensing arm 196 to contact the actuating member 203 of a switch 204 attached to platform 180 and provide an indication when the measured distance is less than a predetermined amount. A supporting bracket 205 is connected to the underside of platform 180 as shown in FIG. 25. A probe member in the form of a rod 206 is connected to bracket 205 so as to extend generally parallel to the axis of rods 197 and 200. Rod 206 is provided with a threaded portion 207 which is received in bracket 205 so as to permit relative adjustment between these two members. Probe 206 is disposed so that the end 208 enters an aperture 210 provided in frame 40, likewise an aperture provided in holding means 20, and finally the recess or hole 14 in the member to be machined as platform 180 is moved toward holding means 20.

The "probe" mechanism operates in the following manner. The holding means 20 is rotated or indexed through another increment of its circular path so that the part 10' is at the probe station as shown in the schematic representation of FIG. 37. The arrival of the part at this station is sensed by the index mechanism which, in turn, activates a solenoid valve S-6, shown in FIG. 44 causing cylinder 195 to retract rod 197 and bring portion 198 of sensing arm 196 into contact with the end of the part as shown in FIG. 28. Platform 180 was previously disposed further to the right in FIGS. 25 and 27 by the biasing action of springs 187, 188. When arm 196 abuts the end of the part 10, however, cylinder 195, being rigidly attached to platform 180, tending to retract rod 197 further, will move platform 180 toward holding means 20, as shown in FIGS. 25 and 27, and against the action of springs 187, 188. This movement of platform 180 causes probe member 208 to enter the hole or recess 14 in the part. The extent of travel in this direction indicates the distance between the end to be machined and the inner end wall of the recess, and if this distance is less than the predetermined minimum, platform 180 will move far enough toward the holding means 20 so that enlargement 202 on rod 200 will abut the actuating member 203 of switch 204. If switch 204 is actuated, this particular part will not be operated on further by the apparatus as will be described presently. If, however, the switch 204 is not actuated the part will be conveyed through the remaining stations where the end surface will be remachined. After a time sufficient to perform the measurement, solenoid valve S-6 operates, under control of indexing means 21, to cause cylinder 195 to extend rod 197 which simultaneously moves arm 196 and rod 206 away from holding means 20. Arm 196 when moved a sufficient distance contacts actuating member 205 of switch 206, attached by bracket 207 to frame 40.

At the next station, termed the "reject" station, the apparatus provided by this invention functions to prevent any further operation on the part if an indication was received from the sensing means, in particular switch 204, previously described. It should be noted that an arrangement could be provided for stopping the machine long enough for removal of the part by an external mechanism or by hand. In a preferred form, however, this invention contemplates means for forcing the part from the holding means. As shown in FIG. 29, a fluid cylinder 220 is operatively connected to a plunger 221 through rod 222 enabling plunger 221 to force the part from holding means 20. Cylinder 220 is attached at one end to a suitable mounting frame 223, and the arrangement of plunger and cylinder is located so that plunger 221 can be reciprocated through an opening 224 provided in frame 40 and likewise through an opening in the holding means so as to contact the part. From the other end of cylinder 220 the rod 222 extends and terminates in a member 225 disposed so as to contact the actuating members 226, and 227 of switches 228 and 229, respectively in the retracted and extended positions of the cylinder 220. A bracket 230 supports the switches, and is connected to the cylinder 220.

Thus, upon conclusion of the "probe" operation at the previously described station, holding means 20 is again moved through another increment of the path. The part is then at what is designated the "reject" station in the schematic diagram of FIG. 37. If switch 204 was not actuated during the previous operation, the reject mechanism described above will not operate and the part will merely rest momentarily at this station awaiting travel to the next station. On the other hand, if switch 204 was actuated, the arrival of the part at this station causes indexing mechanism 21 to operate a solenoid valve S-7, shown in FIG. 44, to extend and then retract cylinder 220. This, in turn, causes plunger 221 to be reciprocated through frame 40 and holding means 20 so as to force the part from the tapered bushing and into a suitable conduit or receptacle for ultimate discarding. Plunger 221 is then withdrawn from the holding means. The reciprocatory movement of plunger 221 is indicated by the operation of switches 228, 229 which operation can be utilized in suitable control arrangements.

The next station to which the part is taken is designated "machine" in FIG. 37, at which station a portion of the material is removed from the end of the part to provide a newly finished or dressed surface. However, the mechanism included at the station designated "eject" in FIG. 37 will first be described because it is structurally similar to the mechanism just described for performing the "reject" function. As shown in FIG. 30, there is provided a cylinder 240 having a plunger 241 operatively connected thereto at one end through rod 242 and located so as to be reciprocated through an opening 243 in frame 40 and another opening in the holding means 20 so as to contact the finished part. Cylinder 240 is connected to a supporting bracket or frame 244. Cylinder rod 242 extends from the other end and terminates in a member 245 which contacts actuating members 246, 247 of switches 248, 249, respectively, for indicating when cylinder 240 is in either of its two operating positions.

When machining (to be described) has been completed and the controlled drive means rotates holding means 20 to carry the part through another increment of its circular path, the arrival of the part at the "eject" station causes indexing mechanism 21 to activate a solenoid valve S-12 shown in FIG. 44 and operate cylinder 240 to extend and retract plunger 241 thus removing the part from holding means 20. The part, of course, would be conveyed through a suitable conduit or chute to a receptacle for finished parts. It will be noted that the only difference in structure between the mechanisms shown in FIGS. 29 and 30 is that the cylinder 240 for ejecting the part is larger in capacity than cylinder 220. During the machining operation the vibrations associated therewith tend to engage the part more firmly in the tapered bushings with the result that a larger force is needed to remove it therefrom.

As indicated schematically in FIG. 37, the part, if it has not been removed from the holding means at the "reject" station, is next taken to the machine station. The mechanism for operating on the part at that station is shown in FIGS. 31—34 and comprises, briefly a milling machine or rotary cutting or drill unit movable horizontally on a slide toward and away from the part which is in holding means 20. As shown in FIG. 31, the milling machine unit 260 is mounted on a slide 261 near holding means 20. Unit 260 can be of the type known commercially as a Hause Holomatic unit, designated Model 24. It includes a motor 262 operatively connected to a suitable arrangement of gears included within a gear box 263. Motor 262 is supported by a bracket 264 which is attached to gear box 263. The gear box 263 is supported by and mounted on slide 261. The rest of the unit 260 is operatively connected by a suitable driving connection 265 to the output of the gearing. This portion of the Hause unit is disposed horizontally and supported on slide 261 and includes an intermediate portion 266 onto which is mounted the control 267 of the unit. A cutting or machining end 268 of the unit includes a cutting mechanism within a casing having an end adapted to snugly engage or fit around stop member 68 in a vacuum-tight manner. A conduit 269 is connected to the end 268 of the unit in proximity to the cutting mechanism and is connected to a suitable suction or vacuum source for withdrawing chips of machined material.

The apparatus for moving slide 261 and Hause unit 260 mounted thereon toward and away from holding means 20 can be seen most clearly by viewing together FIGS. 31—33. The slide includes an upper portion 275 to which cutting mechanism 260 is firmly secured and a lower portion 276 which rests on and moves relative to a bed 277 similar in construction to a conventional lathe bed. The upper and lower portions 275, 276 are separated by a strip 278 or sheet of rigid material which extends out from the slide edge as shown most clearly in FIG. 33. Slide 261 is moved by motive means in the form of fluid cylinder 280 which is operatively connected to slide 261 by means of rod 281 and bracket 282. Slide 261 is locked in various horizontal positions by a braking means comprising a clamp 285 having a viselike arrangement of jaws 286, 287 adapted to firmly but releasably grip the member 278 which extends from the slide. Clamp 285 is supported by a bracket 288. Jaws 286, 287 are opened and closed by rotation of a screw 290 which is operatively connected to a cylinder 291 by means of cylinder rod 292 and connecting arm 293. Cylinder 291 is supported by a bracket 294. Reciprocatory movements of piston rod 292 are thus converted into increments of rotary motion causing jaws 286, 287 to grip or release braking strip 278. As shown in the left-hand corner of FIG. 31 a cam plate 300 is connected to slide 261 and has two lobe portions which cooperate with switches 301, 302 to provide an indication of the two operative positions of slide 261. A bracket 303, pivotally mounted to base 37, functions as a stop for slide 261 and may be moved so as to allow further movement of the slide when the cutter in machine 260 is to changed.

FIG. 34 shows in more detail the manner in which the end 268 of the cutting unit cooperates with stop member 68 for machining the part 10′. The end of the region 268 of the machine housing is provided with a tapered portion 310 adapted to mate with the tapered inner surface 70 of stop member 68. An annular member 311 positioned on the end 268 is provided with a groove therein adapted to meet with the outer tapered surface 71 of the stop member 68. This arrangement insures vibration-free engagement or fit between the milling machine housing and stop member 68. A replaceable cutting member 312 is connected at the end of a Holomatic spindle 313 which is positioned concentric within the machine housing. The conduit 269 is connected to an opening 314 in the housing in proximity to the cutting tool as shown in FIG. 34.

When the part arrives at the "machine" station, the index mechanism causes a solenoid valve S-8, shown in FIG. 44, to operate cylinder 280 to move slide 261 and milling machine 260 toward holding means 20. This continues until end 268 firmly engages or fits over stop member 68 whereupon a solenoid valve S-9, actuated for example in response to the operation of switch 301, operates cylinder 291. Cylinder 291 in extending rod 292 causes jaws 286, 287 to grip strip 278 and lock slide 261 in this horizontal position. Another solenoid valve S-10 then commands the Hause unit 260 to move spindle 313 and cutting tool 312 forward to perform the machining operation at the conclusion of which it is automatically returned. Solenoid valve S-9 is then activated to cause cylinder 291 to retract, opening jaws 286, 287. Solenoid valve S-8 is then activated to cause cylinder 280 to extend so as to move slide 261 and unit 260 away from holding means 20.

In this particular embodiment the amount of material removed from the part is determined by the setting of stop member 68 relative to the end of the part 10′. In other words, for each machining operation, as the rotating cutting tool 312 removes material from the part, it is moved by spindle 313 a given distance relative to housing 268. The location of a point on the housing, in particular the annular member 311, is controlled by the extent to which the stop member 68 projects from holding means 20 or, equivalently, the setting of stop member 68 relative to the end of the part. A cylindrical, threaded stop member positioned in the holding means concentric with respect to the part is a preferred form of various arrangements which may be provided without departing from the spirit and scope of this invention. The only requirement on such arrangements is that the milling machine housing be stopped in its travel toward the holding means, and the stopping point be adjustable in an amount depending upon the location of the end of the part to be machined.

After the machining operation is concluded, holding means 20 is moved through another increment to take the part to the previously described "eject" station shown in FIG. 30. After the part is removed from the holding means, two stations still remain to be considered as indicated schematically in FIG. 37. At what is designated the "reset" station, a mechanism operates on the stop member 68 to readjust its position to a uniform starting position. The mechanism shown in FIG. 35 is quite similar to the mechanism shown in FIGS. 21—24. However, inasmuch as the member 68 will be withdrawn from holding means 20 to a uniform starting position and the part is no longer therein, there is no need for the spring-biased, reciprocable rod 140 and cup-shaped sensing member 141. Referring to FIG. 35, a rotary actuator 320 is attached to frame 40, and the output shaft 321 of actuator 320 is connected through a link 322, pin 323 and member 324 to a rod 325 operatively connected to a carriage (not shown). A switch 326 is actuated to indicate the end of travel of the rod 325 in one direction. A tapered drive wheel 327 is operatively connected to a Gilman spindle 328 which is driven by an air motor through gears supported in the carriage in a manner like that of the mechanism of FIGS. 21—24. A limit switch is actuated when stop member 68 has been returned to its starting position whereupon the actuator 320 moves the carriage and tapered drive wheel away from member 68.

The last station, termed "blowout" includes an air nozzle 330, shown in FIG. 36, disposed near the member 68 and holding means 20 and adapted to provide a blast of air into the opening through member 68 and bushing 55 under control of a solenoid valve S-13 shown in FIG. 44. This insures that no extraneous matter remains in the tapered bushing which would otherwise impair its usefulness. Obviously, if this can be accomplished adequately by the vacuum arrangement in conjunction with the Hause unit 260, this last station may be eliminated.

In the initial brief description of the various operations performed at the particular stations and represented schematically in FIG. 37, the limit switches and solenoid valves were not included. However, in the detailed descriptions of the mechanisms for performing the various operations these switches and valves have been described in terms of their operative relation to the fluid cylinders and mechanisms. It is to be understood that solenoid-operated valves shown in FIG. 37 and also mentioned in conjunction with the detailed descriptions, are under control of indexing mechanism 21, that is, when holding means 20 is indexed through an increment to bring a part to each station, as signalled by the engagement of switch 22 with a stop 23 on the holding means 20, the indexing mechanism will provide the needed sequential control of the various solenoid valves included in the system. Since such control arrangements are readily understood by those skilled in the art, a detailed description is believed to be unnecessary. The various solenoid valves are, in turn, operatively connected to the various motive power means or fluid cylinders previously described in a manner readily understood by those skilled in the art. For convenience, the components designated with an "S" and an additional numerical designation represent both a fluid cylinder and its controlling solenoid-operated valve. For example box "88" at the load station represents cylinder 88 and valve S-2. The fluid circuit connecting these components is shown in FIG. 44 and will be described presently.

FIG. 38 is a timing diagram of the various operations which have been described which diagram should provide an appreciation of the speed with which the apparatus operates as well as an additional aid to understanding the operation thereof. It will be noted from the diagram that about six seconds is needed for the holding means to move an increment and for any of the various operations to be completed. For example, referring to the horizontal portion of the timing diagram corresponding to the "machine" operation, one second is required for the holding means to bring the part to the "machine" station and for the indexing mechanism to initiate the desired sequence of operations. During the next second, slide 261 is moved toward holding means 20 and the end of the cutting mechanism is fit firmly on stop member 68. During the third second, cylinder 291 operates clamp 285 causing the slide to be locked in place. During the next two seconds, the milling machine or Hause unit operates to machine the end of the part. During the last second, three events take place: the cutting mechanism in the machine is withdrawn by the spindle; the clamp is released by cylinder 291; and the slide is returned by cylinder 280. The remaining portions of the diagram may be examined in a like manner.

FIGS. 39—41 reveal an alternative embodiment of the apparatus provided by this invention whereby the mechanisms which operate in conjunction with the "setup" and "reset" stations can be eliminated. It will be recalled that the amount of material removed from the part, for example a welding electrode, is determined by the extent of travel of the cutting mechanism toward the part. This, in turn, was controlled by the position of stop member 68 relative to a point on the housing of the milling machine or unit 260. Instead of controlling the amount of material removed as a function of extent of travel, the amount may be controlled as a function of the number of revolutions of the rotary cutting tool within the milling machine. It is known that a particular rotary cutting tool operating on a particular material will remove a given quantity of material during a given number of rotations and for a given magnitude of force. In the embodiment of FIGS. 39—41, cutting tool revolutions are sensed by suitable indicating means such as an electrical counter operatively connected to the milling machine spindle. What must be provided additionally is a means for sensing the beginning of the machining operation, or, more particularly, the time at which the cutting tool contacts the part to be machined.

In this embodiment, the milling machine or Hause unit 260 is supported by an arrangement including a collar member 349 which surrounds a portion of the unit and which is connected at each end to rods 350, 351 which, in turn, are supported at each end by brackets mounted on slide 261, for example bracket 352. The reason for this supporting arrangement is dictated by the peculiarities of machining away a portion of the end surface of a member. When, for example, an operation such as drilling occurs the cutting tool is partially embedded in the workpiece and thus partially supported thereby. In the machining operation of the present invention, however, the cutting tool partially surrounds or embraces the workpiece and alignment is thus much more difficult to maintain. This two-side support enables alignment to be maintained more readily.

FIG. 41 shows an arrangement for sensing contact between the cutting tool and the part. The milling machine spindle to which the cutting tool is connected is designated 353 and is positioned within a two-part casing member. An outer casing part 354 remains stationary relative to longitudinal movements of the spindle. The inner casing member 355, however, is moved with the spindle and cutting tool. A region 356 defined therebetween is varied in volume according to relative movements of the two members 354, 355. As slide 261 travels toward holding means 20, there will be no relative movement between the members 354, 355. When the cutting tool contacts the part to be machined, however, member 355 moves relative to member 354 causing change in the volume of region 356. This will change the pressure of air within the region which change can be sensed by external means to indicate the beginning of the cut, for example the pressure-sensitive control means designated 357 in FIG. 42. From this point in time the number of revolutions of the cutting tool is measured, and when the predetermined number is reached the tool is withdrawn from the part.

This arrangement enables a given amount of material to be removed from each part regardless of the length thereof. Initial contact between cutting mechanism and part is indicated, and the number of revolutions of the tool is controlled. The "setup" and "reset" stations thus can be eliminated as shown in the schematic diagram of FIG. 42 in which these stations are replaced by an "idle". In addition, hand loading has been substituted for the automatic loading mechanism. This, in turn, necessitates a "tamp" station where the parts must be placed within the tapered bushings of the holding means with sufficient and consistent force. This is accomplished, for example, by an arrangement like that of cylinder 96 and plunger 98 which is more reliable than a human operator. In FIG. 43 hand loading has been substituted for automatic loading, but the "reset" and "setup" stations have been retained. In both arrangements, the "blowout" station is eliminated on the assumption that this can be combined, for example, with the hand-loading operation.

FIG. 44 is a circuit representation of the fluid system included in the apparatus of this invention. The various solenoid valves previously mentioned are represented herein and in a manner showing their operative relation to the various fluid cylinders which, as also described, move the components of the various mechanisms. In preferred form, the fluid system employs air as the motive fluid, and it is obtained from a suitable supply (not shown) under control of a manually-operated directional valve 360. From a pump 361, a line 362 conducts air to the nozzle 330 (FIG. 36) at the "blowout" station under control of solenoid-operated valve S-13. Two additional line components 363, 364 are connected to pump 361. From component 364 a first branch line 365 conducts air to a surge tank 367 from which it is employed to power the various cylinders and air motors under control of corresponding solenoid-operated valves as shown in FIG. 44. Similarly, a second branch line 366 conducts air directly to various cylinders and air motors under control of solenoid operated valves as indicated in the diagram.

Thus, it is seen that the instant invention fully accomplishes its intended objects. While certain embodiments of the invention have been described with specificity this has been done by way of illustration, without thought of limitation.

We claim:
1. Milling apparatus for removing material from one end of a part having a portion extending from said end and adapted to be held so as to expose said end for milling, said apparatus comprising:
   a. movable holding means adapted to grip said extending portion of said part so that said end is exposed and to move said part to successive stations for operation thereon by various mechanisms;
   b. controlled drive means operatively connected to said holding means for moving said holding means through incremental distances at predetermined intervals of time;
   c. indexing means connected in controlled relation to said holding means;
   d. probe means operative under control of said indexing means for measuring the distance between said end of said part and a point on said part spaced from said end;
   e. sensing means operatively connected to said probe means for indicating when said distance is less than a predetermined amount;
   f. reject means operable in response to said sensing means and under control of said indexing means for preventing further operation of said apparatus on said part;
   g. a milling machine having a housing movable toward and away from said end of said part under control of said indexing means, said machine having a cutting mechanism movable within predetermined limits relative to said housing and adapted to operate on said part, the amount of material removed from said part by said cutting mechanism depending upon the distance between said housing and said end of said part; and
   h. means for maintaining a predetermined distance between said milling machine housing and said end of said part.

2. Apparatus as defined in claim 1 further comprising loading means operative under control of said indexing means for receiving a plurality of said parts and for placing in said holding means only those parts which are oriented so that said end will be exposed.

3. Apparatus as defined in claim 1 further comprising means operative under control of said indexing means for removing said part from said holding means after material has been removed from said end.

4. Apparatus as defined in claim 1 wherein said holding means is adapted to move said part through a curvilinear path.

5. Apparatus as defined in claim 4 wherein said holding means comprises a disc-shaped member having a plurality of part gripping means therein.

6. Apparatus as defined in claim 5 wherein said extending portion of said part is tapered in a direction away from said end and wherein each of said gripping means comprises a tapered bushing adapted to receive said extending portion of said part.

7. Apparatus as defined in claim 1 wherein said probe means comprises:
   a. a platform movably connected to a stationary supporting frame;
   b. motive power means connected to said platform for providing reciprocatory output motion;
   c. a first sensing member operatively connected to said motive power means and located so as to be moved toward, in contact with and away from said end of said part in response to the operation of said motive power means;
   d. a second sensing member connected to said platform and located so as to be moved toward, in contact with and away from a point on said part spaced from said end; and
   e. biasing means connected to said frame and to said platform for normally urging said second sensing member away from said part.

8. Apparatus as defined in claim 7 wherein said part is a welding electrode provided with an internal bore extending through the end opposite said end to be machined in a direction generally parallel to the longitudinal axis of said electrode and terminating in an end wall surface spaced from said end to be machined and wherein said second sensing member includes a rod having a diameter smaller than that of said bore and is moved into said bore, in contact with said end wall and out of said bore.

9. Apparatus as defined in claim 1 wherein said sensing means comprises:
   a. a motion transmitting member connected to said probe means and movable to an extent inversely proportional to said distance; and
   b. a switch having an actuating member and operable in response to engagement between said motion transmitting member and said actuating member.

10. Apparatus as defined in claim 7 wherein said sensing means comprises:
   a. a rod connected at one end to said first sensing member and disposed so that the other end is near said platform; and
   b. a switch on said platform and having an actuating member located so as to be contacted by said rod in response to sufficient movement of said first sensing member in the direction toward said end of said part.

11. Apparatus as defined in claim 1 wherein said reject means comprises motive power means for forcing said part out of said holding means.

12. Apparatus as defined in claim 1 wherein said means for maintaining a predetermined distance between said milling machine housing and said end of said part comprises:
   a. a stop member adjustably supported relative to said holding means and having a portion adapted to firmly abut said milling machine housing; and
   b. means operative under control of said indexing means for moving said stop member relative to said milling machine housing an amount depending upon the location of said end of said part.

13. Apparatus as defined in claim 12 wherein said stop member comprises a cylindrical sleeve threadably received in said holding means and said means for moving said stop member comprises:
   a. a drive member adapted to rotate said stop member when moved into contact therewith and itself rotated;
   b. rotary drive means operatively connected to said drive member;
   c. means for moving said drive member and drive means toward and away from said stop member; and
   d. means adapted to contact said end of said part and connected in controlling relation to said means moving said drive member and drive means for controlling the extent to which said stop member is rotated as a function of the location of said end of said part.

14. Apparatus as defined in claim 2 wherein said loading means comprises:
   a. a first part receiving station adapted to receive successive parts randomly oriented in one of two directions;
   b. a second part receiving station communicating with said holding means;
   c. translating means for moving from said first to said second station parts which are oriented in a first direction and for leaving such parts in said first station when oriented in a second direction;
   d. a sensor communicating with said second station for indicating the presence of a part therein;
   e. tamping means movable into and out of said second station for placing a part thereat in said holding means; and
   f. ejecting means movable into said first station in response to the absence of an indication from said sensor for removing a part from said station.

15. Apparatus as defined in claim 14 wherein said translating means comprises:
   a. a member adapted to engage parts when oriented in said first direction and to abut such parts when oriented in said second direction;
   b. first motive power means operatively connected to said member for moving said member into and out of said first station; and
   c. second motive power means operatively connected to said first motive power means for moving said member along said first station.

16. Milling apparatus for removing material from one end of a part having a portion extending from said end and adapted to be held so as to expose said end for milling, said apparatus comprising:
   a. movable holding means adapted to grip said extending portion of said part so that said end is exposed and to move said part to successive stations for operation thereon by various mechanisms;
   b. controlled drive means operatively connected to said holding means for moving said holding means through incremental distances at predetermined intervals of time;
   c. indexing means connected in controlled relation to said holding means;
   d. probe means operative under control of said indexing means for measuring the distance between said end of said part and a point on said part spaced from said end;
   e. sensing means operatively connected to said probe mechanism for indicating when said distance is less than a predetermined amount;
   f. reject means operable in response to said sensing means and under control of said indexing means for preventing further operation of said apparatus on said part; and
   g. a milling machine having a housing movable toward and away from said end of said part under control of said indexing means, said machine having a rotary cutting mechanism reciprocable within said housing, said machine further including sensing means responsive to contact between said cutting mechanism and said part and means responsive to said sensing means for controlling the number of rotations of said cutting mechanism.

17. Apparatus as defined in claim 16 wherein said milling machine sensing means comprising:
   a. a sleeve positioned within said housing and movable within reciprocation of said cutting mechanism, said sleeve and said housing defining a region therebetween; and
   b. means communicating with said region and operative in response to changes in the volume of said region.

18. Apparatus as defined in claim 17 wherein said region is closed and said means communicating with said region is pressure sensitive.